(12) United States Patent
Wang et al.

(10) Patent No.: US 12,069,610 B2
(45) Date of Patent: Aug. 20, 2024

(54) SIDELINK FEEDBACK CHANNEL SIGNALING IN NEW RADIO SIDELINK

(71) Applicant: QUALCOMM Incorporated, San Diego, CA (US)

(72) Inventors: Xiaojie Wang, Hillsborough, NJ (US); Xiaoxia Zhang, San Diego, CA (US); Jing Sun, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/147,326

(22) Filed: Jan. 12, 2021

(65) Prior Publication Data

US 2022/0225279 A1  Jul. 14, 2022

(51) Int. Cl.
*H04W 72/02* (2009.01)
*H04L 1/1812* (2023.01)
*H04W 72/04* (2023.01)
*H04W 72/0446* (2023.01)
*H04W 72/0453* (2023.01)
*H04W 92/18* (2009.01)

(52) U.S. Cl.
CPC ......... *H04W 72/02* (2013.01); *H04L 1/1819* (2013.01); *H04W 72/0446* (2013.01); *H04W 72/0453* (2013.01); *H04W 92/18* (2013.01)

(58) Field of Classification Search
CPC ............ H04W 72/02; H04W 72/0446; H04W 72/0453; H04W 92/18; H04L 1/1819
See application file for complete search history.

(56) References Cited

U.S. PATENT DOCUMENTS

2020/0196255 A1* 6/2020 Cheng ............... H04W 72/10
2020/0313825 A1* 10/2020 Ryu ................. H04L 1/1854
(Continued)

OTHER PUBLICATIONS

CMCC: "Discussion on HARQ Feedback", 3GPP Draft, R1-1900405, 3GPP TSG RAN WG1 Ad-Hoc Meeting 1901, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593319, 4 Pages, Retrieved from the Internet: URL: http://www.3gpp.org/ftp/Meetings%5F3GPP%5FSYNC/RAN1/Docs/R1%2D1900405%2Ezip [retrieved on Jan. 20, 2019] the whole document.

(Continued)

*Primary Examiner* — Awet Haile
(74) *Attorney, Agent, or Firm* — Holland & Hart LLP

(57) ABSTRACT

Methods, systems, and devices for wireless communications are described. A receiving device (e.g., a sidelink user equipment (UE), such as a first UE) may receive sidelink communications from a second UE via a sidelink channel. The receiving device may transmit a feedback message to the second UE via a sidelink feedback channel using a first resource configuration, the feedback message based at least in part on the sidelink communications. The receiving device may identify a second resource configuration of the sidelink feedback channel associated with sidelink communications via the sidelink feedback channel. The receiving device may perform the sidelink communications with the second UE via the sidelink feedback channel using the second resource configuration of the sidelink feedback channel.

28 Claims, 13 Drawing Sheets

(56) References Cited

U.S. PATENT DOCUMENTS

2022/0030522 A1* 1/2022 Vejlgaard ............ H04W 52/245
2022/0417070 A1* 12/2022 Yoshioka .............. H04L 1/1854
2023/0239900 A1* 7/2023 Park ...................... H04L 1/1893
                                                              370/329

OTHER PUBLICATIONS

International Search Report and Written Opinion—PCT/US2021/072758—ISA/EPO—Mar. 17, 2022.

* cited by examiner

SIDELINK FEEDBACK CHANNEL SIGNALING IN NEW RADIO SIDELINK

FIELD OF TECHNOLOGY

The following relates to wireless communications, including sidelink feedback channel signaling in new radio sidelink.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support sidelink feedback channel signaling in new radio sidelink. Generally, the described techniques provide for a long format physical sidelink feedback channel (PSFCH) configuration to support inter-user equipment (UE) sidelink control signaling. For example, UEs may configure additional PSFCH resources that may then be used for control signaling and/or hybrid automatic repeat/request (HARQ) feedback signaling. The control signaling may include inter-UE communications and may, in some examples, utilize a sidelink control information (SCI)-type design for simplicity. The sidelink UEs may perform the inter-UE communications and/or HARQ feedback signaling via the additional PSFCH resources.

A method for wireless communication at a first UE is described. The method may include receiving sidelink communications from a second UE via a sidelink channel, transmitting a feedback message to the second UE via a sidelink feedback channel using a first resource configuration, the feedback message based on the sidelink communications, identifying a second resource configuration of the sidelink feedback channel associated with inter-UE communications via the sidelink feedback channel, and performing the inter-UE communications with the second UE via the sidelink feedback channel using the second resource configuration of the sidelink feedback channel.

An apparatus for wireless communication at a first UE is described. The apparatus may include a processor, memory in electronic communication with the processor, and instructions stored in the memory. The instructions may be executable by the processor to cause the apparatus to receive sidelink communications from a second UE via a sidelink channel, transmit a feedback message to the second UE via a sidelink feedback channel using a first resource configuration, the feedback message based on the sidelink communications, identify a second resource configuration of the sidelink feedback channel associated with inter-UE communications via the sidelink feedback channel, and perform the inter-UE communications with the second UE via the sidelink feedback channel using the second resource configuration of the sidelink feedback channel.

Another apparatus for wireless communication at a first UE is described. The apparatus may include means for receiving sidelink communications from a second UE via a sidelink channel, means for transmitting a feedback message to the second UE via a sidelink feedback channel using a first resource configuration, the feedback message based on the sidelink communications, means for identifying a second resource configuration of the sidelink feedback channel associated with inter-UE communications via the sidelink feedback channel, and means for performing the inter-UE communications with the second UE via the sidelink feedback channel using the second resource configuration of the sidelink feedback channel.

A non-transitory computer-readable medium storing code for wireless communication at a first UE is described. The code may include instructions executable by a processor to receive sidelink communications from a second UE via a sidelink channel, transmit a feedback message to the second UE via a sidelink feedback channel using a first resource configuration, the feedback message based on the sidelink communications, identify a second resource configuration of the sidelink feedback channel associated with inter-UE communications via the sidelink feedback channel, and perform the inter-UE communications with the second UE via the sidelink feedback channel using the second resource configuration of the sidelink feedback channel.

Some examples of the method, apparatuses, and non-transitory computer-readable medium described herein may further include operations, features, means, or instructions for receiving, from the second UE, a different UE, or both, an indication that inter-UE communications will be performed via the sidelink feedback channel using the second resource configuration.

Some examples of the method, apparatuses, and non-transitory computer-readable medium described herein may further include operations, features, means, or instructions for receiving a signal from the second UE, a different UE, a base station, or any combination thereof, configuring the second resource configuration.

Some examples of the method, apparatuses, and non-transitory computer-readable medium described herein may further include operations, features, means, or instructions for multiplexing the feedback message with the inter-UE communications via the sidelink feedback channel.

Some examples of the method, apparatuses, and non-transitory computer-readable medium described herein may further include operations, features, means, or instructions for transmitting the feedback message via the sidelink feedback channel separately from the inter-UE communications via the sidelink feedback channel.

In some examples of the method, apparatuses, and non-transitory computer-readable medium described herein, performing the inter-UE communications may include operations, features, means, or instructions for transmitting, based on a contention-free channel access procedure, the inter-UE communications via the sidelink feedback channel.

In some examples of the method, apparatuses, and non-transitory computer-readable medium described herein, performing the inter-UE communications may include operations, features, means, or instructions for performing a channel access procedure on the sidelink feedback channel and performing the inter-UE communications via the sidelink feedback channel based on a result of the channel access procedure.

In some examples of the method, apparatuses, and non-transitory computer-readable medium described herein, performing the inter-UE communications may include operations, features, means, or instructions for monitoring for a sidelink control information message indicating that inter-UE communications may be to be performed via the sidelink feedback channel and performing the inter-UE communications via the sidelink feedback channel based on a result of the monitoring.

In some examples of the method, apparatuses, and non-transitory computer-readable medium described herein, performing the inter-UE communications may include operations, features, means, or instructions for transmitting a sidelink control information message indicating that the first UE may be to perform inter-UE communications via the sidelink feedback channel and performing the inter-UE communications via the sidelink feedback channel based on the sidelink control information message.

In some examples of the method, apparatuses, and non-transitory computer-readable medium described herein, performing the inter-UE communications via the sidelink feedback channel may include operations, features, means, or instructions for transmitting, receiving, or both, the inter-UE communications via the sidelink feedback channel.

A method for wireless communication at a first UE is described. The method may include transmitting sidelink communications to a second UE via a sidelink channel, receiving a feedback message from the second UE via a sidelink feedback channel using a first resource configuration, the feedback message based on the sidelink communications, identifying a second resource configuration of the sidelink feedback channel associated with inter-UE communications via the sidelink feedback channel, and performing the inter-UE communications with the second UE via the sidelink feedback channel using the second resource configuration of the sidelink feedback channel.

An apparatus for wireless communication at a first UE is described. The apparatus may include a processor, memory in electronic communication with the processor, and instructions stored in the memory. The instructions may be executable by the processor to cause the apparatus to transmit sidelink communications to a second UE via a sidelink channel, receive a feedback message from the second UE via a sidelink feedback channel using a first resource configuration, the feedback message based on the sidelink communications, identify a second resource configuration of the sidelink feedback channel associated with inter-UE communications via the sidelink feedback channel, and perform the inter-UE communications with the second UE via the sidelink feedback channel using the second resource configuration of the sidelink feedback channel.

Another apparatus for wireless communication at a first UE is described. The apparatus may include means for transmitting sidelink communications to a second UE via a sidelink channel, means for receiving a feedback message from the second UE via a sidelink feedback channel using a first resource configuration, the feedback message based on the sidelink communications, means for identifying a second resource configuration of the sidelink feedback channel associated with inter-UE communications via the sidelink feedback channel, and means for performing the inter-UE communications with the second UE via the sidelink feedback channel using the second resource configuration of the sidelink feedback channel.

A non-transitory computer-readable medium storing code for wireless communication at a first UE is described. The code may include instructions executable by a processor to transmit sidelink communications to a second UE via a sidelink channel, receive a feedback message from the second UE via a sidelink feedback channel using a first resource configuration, the feedback message based on the sidelink communications, identify a second resource configuration of the sidelink feedback channel associated with inter-UE communications via the sidelink feedback channel, and perform the inter-UE communications with the second UE via the sidelink feedback channel using the second resource configuration of the sidelink feedback channel.

Some examples of the method, apparatuses, and non-transitory computer-readable medium described herein may further include operations, features, means, or instructions for transmitting, to the second UE, a different UE, or both, an indication that inter-UE communications will be performed via the sidelink feedback channel using the second resource configuration.

Some examples of the method, apparatuses, and non-transitory computer-readable medium described herein may further include operations, features, means, or instructions for transmitting a signal to the second UE, a different UE, a base station, or any combination thereof, configuring the second resource configuration.

In some examples of the method, apparatuses, and non-transitory computer-readable medium described herein, the feedback message may be multiplexed with the inter-UE communications via the sidelink feedback channel.

Some examples of the method, apparatuses, and non-transitory computer-readable medium described herein may further include operations, features, means, or instructions for receiving the feedback message via the sidelink feedback channel separately from the inter-UE communications via the sidelink feedback channel.

In some examples of the method, apparatuses, and non-transitory computer-readable medium described herein, performing the inter-UE communications may include operations, features, means, or instructions for transmitting, based on a contention-free channel access procedure, the inter-UE communications via the sidelink feedback channel.

In some examples of the method, apparatuses, and non-transitory computer-readable medium described herein, performing the inter-UE communications may include operations, features, means, or instructions for performing a channel access procedure on the sidelink feedback channel and performing the inter-UE communications via the sidelink feedback channel based on a result of the channel access procedure.

In some examples of the method, apparatuses, and non-transitory computer-readable medium described herein, performing the inter-UE communications may include operations, features, means, or instructions for transmitting a sidelink control information message indicating that inter-UE communications may be to be performed via the sidelink feedback channel and performing the inter-UE communications via the sidelink feedback channel based on a result of the sidelink control information message.

In some examples of the method, apparatuses, and non-transitory computer-readable medium described herein, performing the inter-UE communications may include operations, features, means, or instructions for receiving a sidelink control information message indicating that the second UE may be to perform inter-UE communications via the sidelink feedback channel and performing the inter-UE communications via the sidelink feedback channel based on the sidelink control information message.

In some examples of the method, apparatuses, and non-transitory computer-readable medium described herein, performing the inter-UE communications via the sidelink feedback channel may include operations, features, means, or instructions for transmitting, receiving, or both, the inter-UE communications via the sidelink feedback channel.

DETAILED DESCRIPTION

Wireless communications support sidelink communications (e.g., inter-user equipment (UE) communications via sidelink channels, such as a physical sidelink shared channel (PSSCH)). Sidelink protocols support hybrid automatic repeat/request (HARQ) feedback signaling via a physical sidelink feedback channel (PSFCH). The PSFCH may be enabled for unicast and groupcast transmissions and configured during the last two symbols of a slot. However, the PSFCH use is typically low and is limited to HARQ feedback messages. Moreover, the sidelink communications are typically scheduled/configured using sidelink control information (SCI) messages communicated via the PSSCH and a sidelink control channel (PSCCH). However, there are other control signaling information (e.g., inter-UE communications) that may be more beneficial to communicate using SCI-format messages.

Aspects of the disclosure are initially described in the context of wireless communications systems. Generally, the described techniques provide for a long format PSFCH configuration to support inter-UE sidelink control signaling. For example, UEs may configure additional PSFCH resources that may then be used for control signaling and/or HARQ feedback signaling. The control signaling may include inter-UE communications and may, in some examples, utilize a SCI-type design for simplicity. The sidelink UEs may perform the inter-UE communications and/or HARQ feedback signaling via the additional PSFCH resources.

Aspects of the disclosure are further illustrated by and described with reference to apparatus diagrams, system diagrams, and flowcharts that relate to sidelink feedback channel signaling in new radio sidelink.

Figure 1:
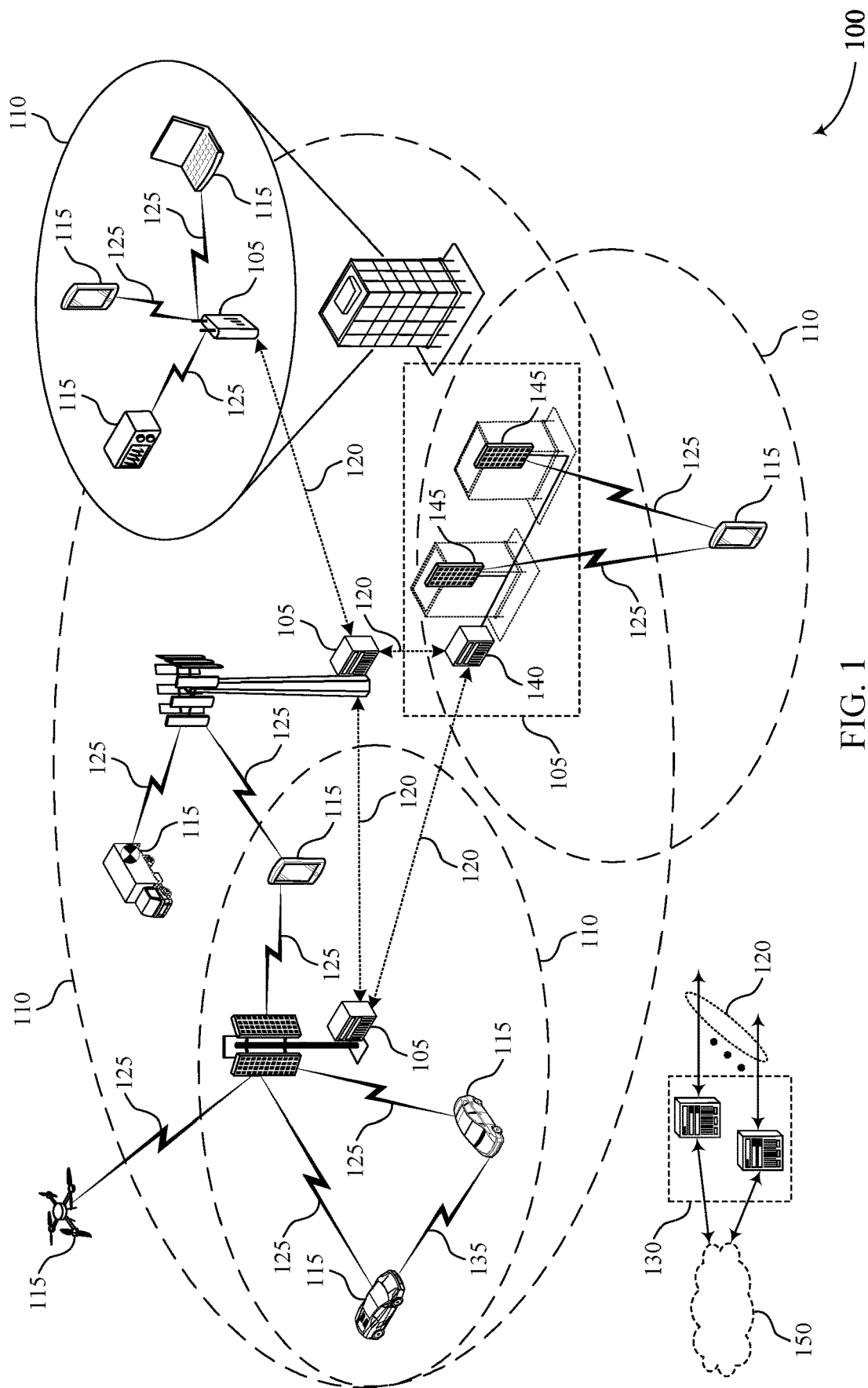
FIG. 1 illustrates an example of a wireless communication system that supports sidelink feedback channel signaling in new radio sidelink in accordance with aspects of the present disclosure.

FIG. 1 illustrates an example of a wireless communication system 100 that supports sidelink feedback channel signaling in new radio sidelink in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 (e.g., a first UE in this example, which may also be referred to as a receiving device) receive sidelink communications from a second UE via a sidelink channel. The UE 115 may transmit a feedback message to the second UE via a sidelink feedback channel using a first resource configuration, the feedback message based at least in part on the sidelink communications. The UE 115 may identify a second resource configuration of the sidelink feedback channel associated with sidelink communications via the sidelink feedback channel. The UE 115 may perform the sidelink communications with the second UE via the sidelink feedback channel using the second resource configuration of the sidelink feedback channel.

A UE 115 (e.g., a first UE in this example, which may also be referred to as a transmitting device) may transmit sidelink communications to a second UE via a sidelink channel. The UE 115 may receive a feedback message from the second UE via a sidelink feedback channel using a first resource configuration, the feedback message based at least in part on the sidelink communications. The UE 115 may identify a second resource configuration of the sidelink feedback channel associated with sidelink communications via the sidelink feedback channel. The UE 115 may perform the sidelink communications with the second UE via the sidelink feedback channel using the second resource configuration of the sidelink feedback channel.

That is, references herein to a first UE and/or a second UE may depend on the context/perspective of that particular discussion. For example, in some situations the first UE may refer to a UE 115 receiving sidelink communications from a second UE and transmitting a feedback message to the second UE for the sidelink communications. In that example, the first UE may refer to the receiving device (e.g., the UE 115 receiving the sidelink communications and transmitting the feedback message) and the second UE may refer to the transmitting device (e.g., the UE 115 transmitting the sidelink communications and receiving the feedback message from the first UE). In other examples, the first UE may refer to a UE 115 transmitting sidelink communications to a second UE and receiving a feedback message from the second UE for the sidelink communications. In that example, the first UE may refer to the transmitting device (e.g., the UE 115 transmitting the sidelink communications and receiving the feedback message) and the second UE may refer to the receiving device (e.g., the UE 115 receiving the sidelink communications and transmitting the feedback message to the first UE). Accordingly, aspects of the techniques described herein may use the terms transmitting device and receiving device, rather than first UE/second UE, for simplicity.

Figure 2:
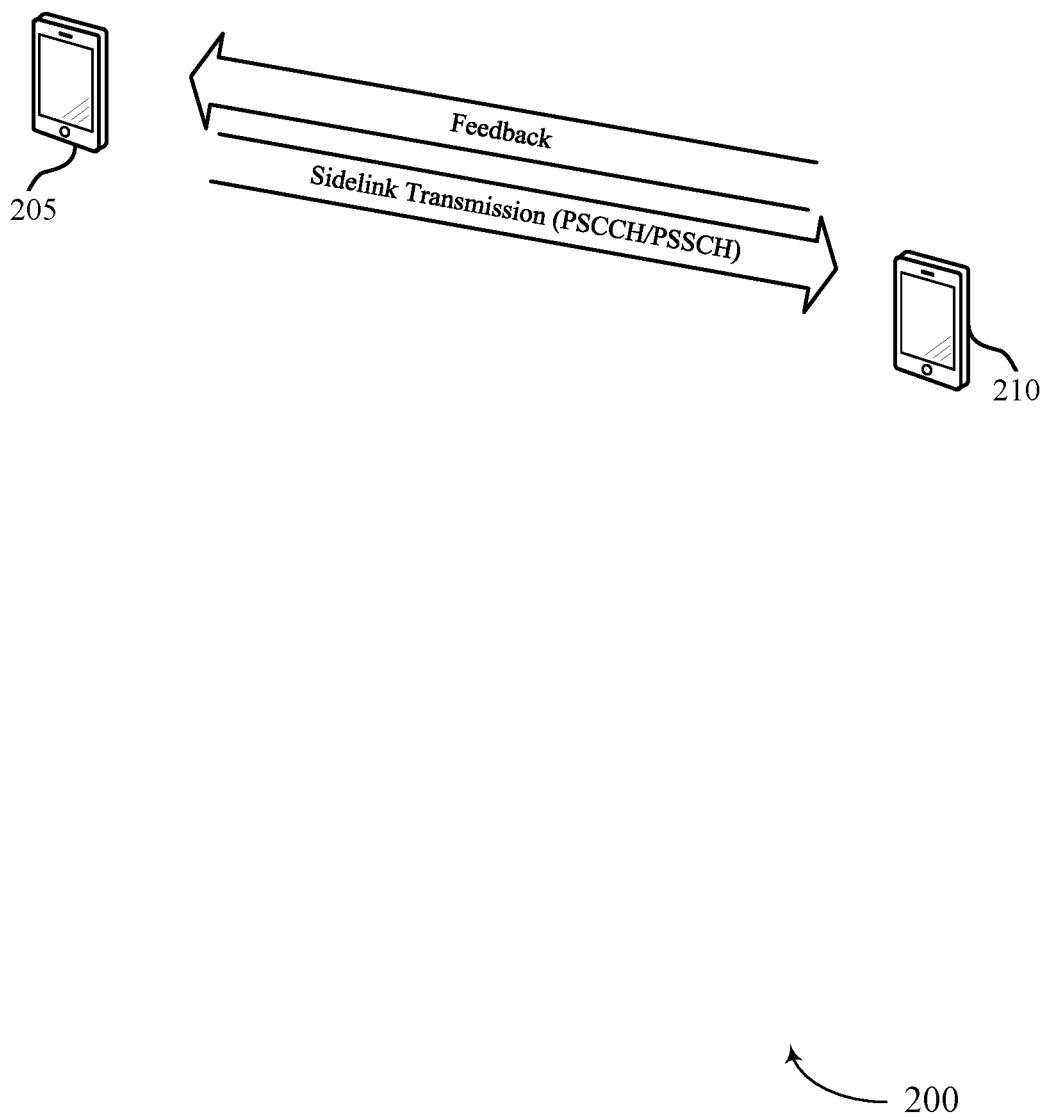
FIG. 2 illustrates an example of a wireless communication system that supports sidelink feedback channel signaling in new radio sidelink in accordance with aspects of the present disclosure.

FIG. 2 illustrates an example of a wireless communication system 200 that supports sidelink feedback channel signaling in new radio sidelink in accordance with aspects of the present disclosure. Wireless communication system 200 may implement aspects of wireless communication system 100. Wireless communication system 200 may include UE 205 and UE 210, which may be examples of the corresponding devices described herein. Generally, UE 205 may be referred to as a transmitting device and UE 210 may be referred to as a receiving device.

Wireless communication system 200 may support sidelink communications (e.g., inter-UE communications via sidelink channel(s)). Sidelink protocols support HARQ feedback signaling via a sidelink feedback channel (e.g., PSFCH). The PSFCH resources may be enabled for unicast and groupcast transmissions. For example, the PSFCH resources may use a PUCCH format 0 waveform structure. The PSFCH resources may use one bit to convey acknowledgment/negative-acknowledgment (ACK/NACK) feedback for unicast transmissions. For groupcast transmissions, the PSFCH resources may be used to indicate NACK-only or may be used for ACK/NACK feedback. Such legacy PSFCH resources may also be referred to as a first resource configuration.

The PSFCH resources (e.g., the first resource configuration) may be configured during the last two symbols of a slot, may have a corresponding period (e.g., $\{0, 1, 2, 4\}$), and may use a zero ("0") to indicate that PSFCH is disabled. Such indication may typically be carried in one bit of SCI-1 (which is typically carried or otherwise conveyed via PSCCH). The PSFCH resources may have a minimum time gap of two or three symbols (e.g., $\{2, 3\}$), which generally defines the time gap between receiving a PSSCH reception and the corresponding PSFCH feedback. The PSFCH resources may support cyclic shifting pairs for the PSFCH transmission, with the number of cyclic shift pairs corresponding to $\{1, 2, 3, 4, 6\}$. Generally, the PSFCH resources may be (pre-)configured using a rbSetPSFCH bitmap (e.g., carried in configuration signaling).

In some wireless communication systems, sidelink communications include transmitting signaling messages in SCI-1, SCI-2, and PSSCH. SCI-1 is transmitted via PSCCH and identifies at least a portion of the information associated with SCI-2 as well as the corresponding PSSCH data transmission being scheduled by SCI-1. SCI-2 is transmitted via PSSCH and indicates the final scheduling/parameter information for the corresponding PSSCH data transmission. SCI-1 and SCI-2 are generally considered a two-part SCI (e.g., one SCI broken down into two parts) for the sidelink communications and are associated or otherwise linked to the corresponding PSSCH data transmission. Accordingly, SCI and PSSCH are generally associated with each other and transmitted together.

However, such wireless communication systems do not provide any mechanism for a stand-alone SCI transmission. This may prevent sidelink devices from transmitting stand-alone sidelink control signaling via the sidelink channels. That is, such wireless communication systems would require a sidelink device with sidelink control signaling (e.g., sidelink communications) to transmit SCI-1 and SCI-2 scheduling a PSSCH data transmission. The sidelink device would then transmit their sidelink control signaling via the PSSCH data transmission. This technique is inefficient and wasteful when the sidelink device only has sidelink control signaling to send (e.g., a small data payload).

Accordingly, aspects of the described techniques provide various mechanisms that support scheduling or otherwise allocating at least a portion of PSFCH resources for inter-UE sidelink communications. In some aspects, these techniques may utilize a stand-alone SCI format transmitted over PSFCH resources that support inter-UE coordination, scheduling request (SR) transmission, spatial reuse parameter signaling, resource release signaling, and the like, between sidelink UEs.

In some aspects, this may include the sidelink UEs performing sidelink communications via a sidelink channel (e.g., PSCCH transmission of SCI-1 and PSSCH transmission of SCI-2 and the corresponding PSSCH data communications). For example, a transmitting device may transmit or otherwise provide sidelink communications to a receiving device via a sidelink channel. The receiving device may respond by transmitting or otherwise providing a feedback message to the transmitting device via PSFCH using the first resource configuration. In some examples, the first resource configuration may correspond to the legacy PSFCH resources configured for the last two symbols of the slot (e.g., the two symbols preceding a gap period allocated to the final symbol of the slot). The feedback message in this situation may be for the sidelink communications (e.g., may convey ACK/NACK feedback information for the PSCCH and/or PSSCH transmission(s)).

However, a second resource configuration of time, frequency, spatial, code, etc., resources of PSFCH may be identified, scheduled, allocated, or otherwise associated with sidelink communications via PSFCH. That is, the second resource configuration of resources of PSFCH may provide additional PSFCH resources to support inter-UE coordination of sidelink control signaling between the sidelink UEs. The second resource configuration may include none, some, or all of the resources in the first resource configuration (e.g., the legacy PSFCH resources allocated to the last two symbols of some slots).

This may include a long format PSFCH being configured as a shared resource pool for sidelink control signaling messages (e.g., the resource(s) of the second resource configuration may be shared, in some examples). The short format PSFCH may still be used for HARQ feedback (e.g., the first resource configuration may be used for feedback message transmission). The resources of the second resource configuration may be scheduled, allocated, or otherwise identified on an optional basis. That is, the second resource configuration for inter-UE coordination may be scheduled, allocated, or otherwise identified according to a periodic schedule (e.g., always available) and/or on an as-needed basis (e.g., based on a request for such resources from one or more sidelink devices). Accordingly, a second subset of long format PSFCH resources may be scheduled, allocated, or otherwise identified and used for transmitting sidelink control signaling messages (e.g., inter-UE coordination, or more generically sidelink communications).

In some examples, the resources of the second resource configuration for PSFCH may be configured using RRC signaling, MAC control element (CE) signaling, DCI signaling, and the like. For example, the transmitting device and/or receiving device may transmit/receive a signal from any the other device or any other sidelink UE and/or base station configuring the second resource configuration. In an example where the transmitting device and/or receiving device are acting as scheduling devices for sidelink communications, either device may schedule, allocate, or otherwise identify the resources of PSFCH for the second resource configuration. In this situation, the transmitting device and/or receiving device may transmit the signal configuring the second resource configuration to the other device and/or other sidelink devices.

Additionally, or alternatively, the resources of the second resource configuration for PSFCH may be configured on a per-resource pool configuration basis. For example, the resources of PSFCH for the second resource configuration may be associated with a resource pool comprising persistent or semi-persistent resources available for sidelink communications. In another example, the resources of PSFCH for the second resource configuration may be associated with a resource pool comprising dynamically scheduled resources available for sidelink communications.

In some examples, the resources of PSFCH for the second resource configuration may only be accessible for use by the receiving device. That is, only receiving devices on the sidelink channel (e.g., UEs receiving sidelink transmissions during a particular slot) may be allowed to access the second resource configuration to transmit such sidelink control signaling messages. As discussed above, examples of the sidelink communications using the resources of PSFCH in the second resource configuration may be used for inter-UE coordination, SR transmissions, spatial reuse parameter signaling, resource release signaling, and the like (e.g., sidelink control signaling).

In some aspects, HARQ feedback signaling may be transmitted separately from the sidelink communications or may be multiplexed with the sidelink communications and transmitted via the second resource configuration of PSFCH. That is, in some examples a receiving device may multiplex the feedback message with sidelink communications via PSFCH. In other examples the receiving device may transmit the feedback message via PSFCH separately from sidelink communications transmitted via PSFCH.

In some aspects, the transmitting device may schedule, allocate, or otherwise identify the resources of PSFCH for the second resource configuration in a groupcast scenario. For a unicast scenario, the receiving device may transmit on the second resource configuration independently (e.g., on its own) or on behalf of the transmitting device (e.g., to signal a resource release). One non-limiting example use case for such techniques may include the receiving device repeating (e.g., relaying) resource reservations in SCI-1 for other sidelink devices that are unable to decode SCI-1 due to half-duplex operations, interference, collisions, etc. In some examples, other sidelink devices may attempt to blindly decode the second resource configuration in order to detect such inter-UE coordination.

In some aspects, the sidelink communications performed using the second resource configuration may be associated with a particular format. In one example, this may include using a format similar to SCI-1 and/or SCI-2 (e.g., a similar or same number of resource blocks, MCS, and the like). In some examples, the first symbol of the resources of PSFCH in the second resource configuration may be used for automatic gain control (AGC). In some example, the resources of PSFCH in the second resource configuration may be limited to one subchannel, may span multiple subchannels, or may span all subchannels of the frequency band being used for sidelink communications. In some examples involving a unicast transmission type where PSSCH spans multiple subchannels, the receiving device may transmit one signaling message in each subchannel (e.g., repeat the same signaling message in each subchannel and/or may transmit different signaling messages in different subchannels). In some examples involving a groupcast transmission type where PSSCH spans multiple subchannels, the transmitting device may schedule, allocate, or otherwise identify the resources of PSFCH for the second resource configuration for a groupcast transmission.

In some examples, the resources of PSFCH in the second resource configuration may be accessible by the transmitting device, a receiving device, or any other sidelink device (e.g., may be a shareable resource pool). In this situation, the receiving device may monitor the second resource configuration to receive the sidelink communications via PSFCH from the transmitting device, base station, or any other sidelink device. In some aspects, if the transmitting device did not expect to receive HARQ feedback and/or sidelink communications in the resources of PSFCH in the second resource configuration, the transmitting device may transmit the inter-UE coordination (e.g., sidelink control signaling) using those resources.

In some examples, this may include the transmitting device and receiving device performing sidelink communication transmissions using the second resource configuration simultaneously. For example, the transmitting device and receiving device may determine that the second resource configuration is available and therefore perform inter-UE coordination using the resources of PSFCH in the second resource configuration. In some aspects, the transmitting device may transmit or others provide an indication (e.g., in SCI-1 and/or SCI-2) that it intends to transmit sidelink communications using the resources of PSFCH in the second resource configuration. In some examples, the receiving device may decide to transmit the sidelink communications using the second resource configuration, such as when the sidelink communications are transmitted to a different sidelink device and use different resource(s) of the second resource configuration. In some examples, the receiving device may postpone its transmission of sidelink communications using the second resource configuration in the situation where the receiving device receives an indication that the transmitting device (or some other sidelink device) is going to perform sidelink communications using the second resource configuration. In some examples, the receiving device may transmit an indication (e.g., using an SCI) that it intends to perform sidelink communications via the sidelink feedback channel (e.g., may indicate that it intends to utilize the resources of PSFCH in the second resource configuration to other sidelink devices).

In some examples, the transmitting device may configure the receiving device to skip/delay sidelink control signaling transmissions in some slots, such as the slots that the transmitting device intends to transmit its own sidelink control signaling. For example, the transmitting device may transmit or otherwise provide an indication that the receiving device is to skip the sidelink control signaling transmissions for certain slots using SCI-1 and/or SCI-2. In this situation, the transmitting device may perform the sidelink control signaling transmission using all or some of the resources in the second resource configuration. In some situations, sidelink control signaling transmissions may be performed on behalf of the receiving devices (e.g., by the transmitting device).

In some examples, the resources of PSFCH in the second resource configuration may be contention-free resources, such that sidelink devices may transmit sidelink communications via PSFCH based on a contention-free channel access procedure. For example, the second resource configuration may include a resource allocation configured by the transmitting device, a base station managing aspects of sidelink communications, and/or some other sidelink device. In some aspects, SCI-1, SCI-2, and/or other signaling techniques (e.g., upper layer signaling) may be used to provide an indication that the second resource configuration is available for use and/or otherwise allocated. In some examples, the resources of PSFCH in the second resource configuration may use contention-based access. For example, in this situation any sidelink device may have access to the second resource configuration for sidelink control signaling after performing a channel access procedure (e.g., such as a clear channel assessment (CCA), a listen-before-talk (LBT) procedure, and the like). In one example, this may include a best-effort delivery for each sidelink device uses the random access for (e.g., to access) the second resource configuration. In another example, the transmitting device may perform signal strength measurements in resource(s) of the second resource configuration. If the measured signal strength is less than a threshold (e.g., satisfies a threshold), the transmitting device may access the channel after a random back-off time. If the measured signal strength is greater than the threshold (e.g., fails to satisfy the threshold), the transmitting device may determine the channel is busy and therefore wait a period of time before attempting another channel access procedure. In some examples, the transmitting device may monitor resource(s) of the second resource configuration to detect collisions. The transmitting device may adjust its channel access according to detected collision(s) (e.g., may use a larger back-off if the collision rate is high).

In another example, this may include a first-come-first-serve scenario based on an indication that another sidelink device is to perform the sidelink communications (e.g., the sidelink control signaling). For example, any sidelink device may monitor for a transmission indication in selected subchannels or every subchannel from other sidelink devices. If the sidelink device determines that the channel is occupied (e.g., receives an indication that another sidelink devices going to transmit using the second resource configuration), that sidelink device may perform a backoff and wait to perform its sidelink communications. If the sidelink device determines that the second resource configuration is not occupied, it may wait a certain number of symbols and/or slots and then transmit its own indication that it will perform sidelink communications using the second resource configuration. After transmitting its indication to transmit, the sidelink device may access the channel in the current symbol/slot and/or in subsequent symbol(s)/slot(s). In some examples, the subchannel selection for the sidelink communication transmission using the second resource configuration may be based on various factors, such as available subchannels, an identifier of the sidelink device, a UE capabilities, and the like. In some examples, the indication that the sidelink device is going to transmit using the second resource configuration may carry or otherwise convey an indication of how long the sidelink device intends to occupy the channel (e.g., such as indicating an amount of data to be transmitted, an amount of subchannels to be used for the transmission, an amount of symbol(s)/slot(s) to be used for the transmission, and the like).

In some examples, the reservation of the second resource configuration may be based on SCI-1 and/or SCI-2. For example, the reservation (e.g., transmission of the indication that the sidelink device is going to transmit using the second resource configuration) may be made before transmission in SCI-1 and/or SCI-2 (e.g., using a new SCI-2 format). In this situation, other sidelink devices attempting to use the second resource configuration may decode SCI-2 messages of other sidelink devices in order to identify or otherwise determine the reservations.

In some aspects, a hybrid or mixture of the examples discussed above may be used. That is, slots occupied/reserved by a sidelink device (e.g., based on their indication to transmit) may use contention-free channel access and slots not occupied by a sidelink device (e.g., absent any indication to transmit) may use contention based channel access procedures. Accordingly and in a contention-free access procedure scenario, the sidelink device may, after transmitting its indication to transmit, transmit the sidelink communications using the second resource configuration of PSFCH. In the contention-based channel access procedure (e.g., a CCA procedure), the sidelink device may perform the CCA procedure on the resources of PSFCH in the second resource configuration and perform the sidelink communications via PSFCH based on the result of the CCA procedure.

Figure 3:
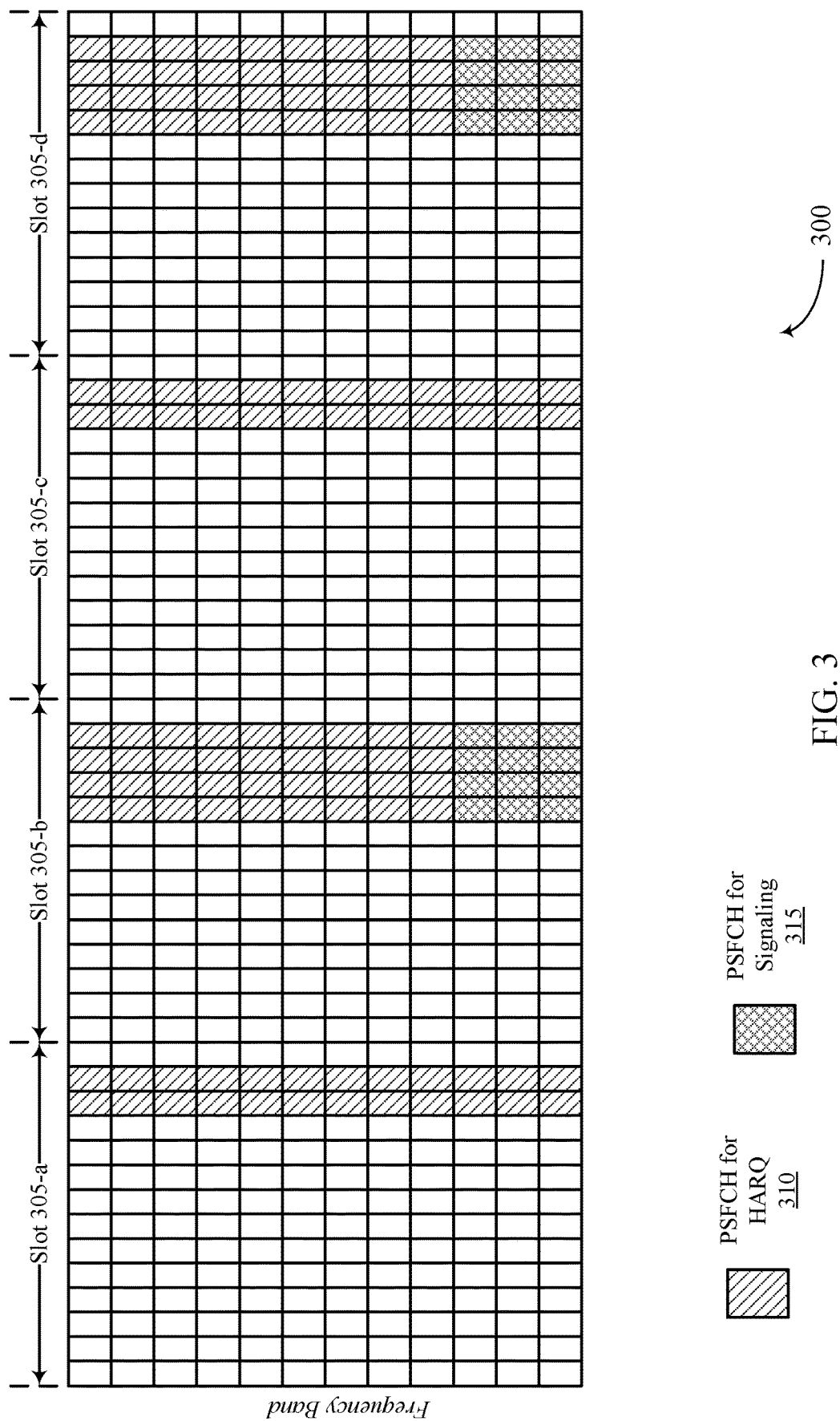
FIG. 3 illustrates an example of a feedback configuration that supports sidelink feedback channel signaling in new radio sidelink in accordance with aspects of the present disclosure.

FIG. 3 illustrates an example of a feedback configuration 300 that supports sidelink feedback channel signaling in new radio sidelink in accordance with aspects of the present disclosure. Feedback configuration 300 may implement aspects of wireless communication systems 100 and/or 200. Aspects of feedback configuration 300 may be implemented by or implemented at a UE, which may be an example of the corresponding device described herein (e.g., a transmitting device, receiving device, or more generically a sidelink device).

As discussed above, aspects of the described techniques provide for a transmitting device to transmit sidelink communications to a receiving device via a sidelink channel (e.g., PSCCH and PSSCH communications). The sidelink communications may include SCI-1 transmitted via PSCCH, SCI-2 transmitted via PSSCH, as well as the data payload being transmitted via PSSCH. The sidelink communications may be transmitted over one or more slots 305, with four slots 305 being shown by way of example only. The receiving device may transmit or otherwise provide a feedback message to the transmitting device via a sidelink feedback channel (e.g., PSFCH) using a first resource configuration (illustrated as PSFCH for HARQ 310). As discussed above, PSFCH for HARQ 310 (e.g., the first resource configuration) is typically configured to the last two symbols of the slot 305 (technically the last symbol of the slot 305 may be reserved as a gap period to allow for transmit-to-receive transitions, or vice versa, by the sidelink devices). Accordingly, the gap symbol may occupy the last symbol of the slot 305 and the PSFCH for HARQ 310 may occupy the two preceding symbols of the slot 305.

The transmitting device and/or receiving device may identify or otherwise determine a second resource configuration (illustrated as PSFCH for signaling 315) of PSFCH that are scheduled, allocated, or otherwise associated with sidelink communications (e.g., sidelink control signaling) via PSFCH. For example, the second resource configuration may be configured by a scheduling device within the sidelink network, such as a transmitting device, base station, and the like. In some examples, the second resource configuration may be associated with a particular resource pool configuration. Accordingly, the receiving device and/or transmitting device may perform sidelink communications (e.g., sidelink control signaling) via PSFCH using the second resource configuration (e.g., PSFCH for signaling 315).

In the non-limiting example illustrated in feedback configuration 300, this may include the first resource configuration (e.g., PSFCH for HARQ 310) being configured in slot 305-a, slot 305-b, slot 305-c, and slot 305-d (e.g., every slot 305), although PSFCH for HARQ 310 may not always be configured for every slot 305. The first resource configuration may be configured for two symbols of slot 305-a and slot 305-c, and, for each of these two slots, may span the full frequency band (e.g., every subchannel) used for sidelink communications. The first resource configuration may be configured for three symbols of slots 305-b and 305-d and, for each of these two slots, may span a subset of subchannels of the full frequency band. Accordingly, the receiving device may transmit the feedback message to the transmitting device using the first resource configuration (e.g., PSFCH for HARQ 310) during one or more of slots 305.

In the non-limiting example illustrated in feedback configuration 300, this may include the second resource configuration (e.g., PSFCH for signaling 315) being configured during three symbols of slot 305-b and slot 305-d, and, for each of these two slots, may span a subset of subchannels of the full frequency band. Accordingly, the receiving device may transmit the sidelink communications (e.g., the sidelink control signaling) to the transmitting device (and/or some other sidelink device) using the second resource configuration (e.g., PSFCH for signaling 315). In some examples, the sidelink communications performed using the second resource configuration may use a SCI-type format (e.g., similar to the formats used for SCI-1 and/or SCI-2).

Figure 4:
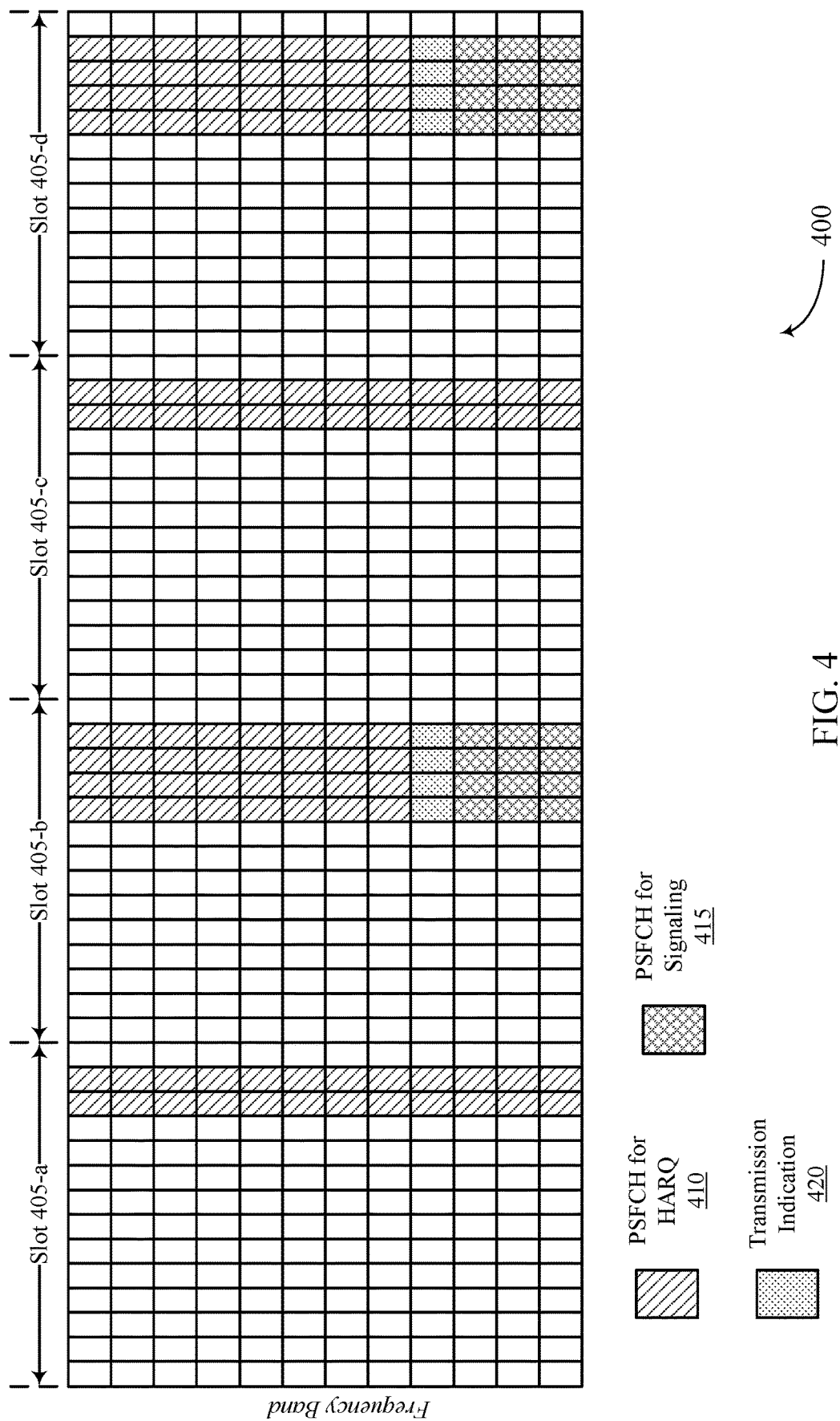
FIG. 4 illustrates an example of a feedback configuration that supports sidelink feedback channel signaling in new radio sidelink in accordance with aspects of the present disclosure.

FIG. 4 illustrates an example of a feedback configuration 400 that supports sidelink feedback channel signaling in new radio sidelink in accordance with aspects of the present disclosure. Feedback configuration 400 may implement aspects of wireless communication systems 100 and/or 200 and/or feedback configuration 300. Aspects of feedback configuration 400 may be implemented by or implemented at a UE, which may be an example of the corresponding device described herein (e.g., a transmitting device, receiving device, or more generically a sidelink device).

As discussed above, aspects of the described techniques provide for a transmitting device to transmit sidelink communications to a receiving device via a sidelink channel (e.g., PSCCH and PSSCH communications). The sidelink communications may include SCI-1 transmitted via PSCCH, SCI-2 transmitted via PSSCH, as well as the data payload being transmitted via PSSCH. The sidelink communications may be transmitted over one or more slots 405, with four slots 405 being shown by way of example only. The receiving device may transmit or otherwise provide a feedback message to the transmitting device via a sidelink feedback channel (e.g., PSFCH) using a first resource configuration (illustrated as PSFCH for HARQ 410). As discussed above, PSFCH for HARQ 410 (e.g., the first resource configuration) is typically configured to the last two symbols of the slot 405 (technically the last symbol of the slot 405 may be reserved as a gap period to allow for transmit-to-receive transitions, or vice versa, by the sidelink devices). Accordingly, the gap symbol may occupy the last symbol of the slot 405 and the PSFCH for HARQ 410 may occupy the two preceding symbols of the slot 405.

The transmitting device and/or receiving device may identify or otherwise determine a second resource configuration (illustrated as PSFCH for signaling 415) of PSFCH that are scheduled, allocated, or otherwise associated with sidelink communications (e.g., sidelink control signaling) via PSFCH. For example, the second resource configuration may be configured by a scheduling device within the sidelink network, such as a transmitting device, base station, and the like. In some examples, the second resource configuration may be associated with a particular resource pool configuration. Accordingly, the receiving device and/or transmitting device may perform sidelink communications (e.g., sidelink control signaling) via PSFCH using the second resource configuration (e.g., PSFCH for signaling 415).

In the non-limiting example illustrated in feedback configuration 400, this may include the first resource configuration (e.g., PSFCH for HARQ 410) being configured in slot 405-*a*, slot 405-*b*, slot 405-*c*, and slot 405-*d* (e.g., every slot 405), although PSFCH for HARQ 410 may not always be configured for every slot 405. The first resource configuration may be configured for two symbols of slot 405-*a* and slot 405-*c*, and, for each of these two slots, may span the full frequency band (e.g., every subchannel) used for sidelink communications. The first resource configuration may be configured for three symbols of slots 405-*b* and 405-*d* and, for each of these two slots, may span a subset of subchannels of the full frequency band. Accordingly, the receiving device may transmit the feedback message to the transmitting device using the first resource configuration (e.g., PSFCH for HARQ 410) during one or more of slots 405.

In the non-limiting example illustrated in feedback configuration 400, this may include the second resource configuration (e.g., PSFCH for signaling 415) being configured during three symbols of slot 405-*b* and slot 405-*d*, and, for each of these two slots, may span a subset of subchannels of the full frequency band. Accordingly, the receiving device may transmit the sidelink communications (e.g., the sidelink control signaling) to the transmitting device (and/or some other sidelink device) using the second resource configuration (e.g., PSFCH for signaling 415). In some examples, the sidelink communications performed using the second resource configuration may use a SCI-type format (e.g., similar to the formats used for SCI-1 and/or SCI-2).

As also discussed above, in some examples the sidelink devices (e.g., the transmitting device, receiving device, or any other sidelink device) may transmit an indication that it intends to perform the sidelink communications using the second resource configuration of PSFCH (e.g., using PSFCH for signaling 415). In the non-limiting example illustrated in FIG. 4, this may include certain resources (e.g., illustrated as transmission indication 420) being used to transmit the indication. That is, in this example a certain set of resources (e.g., a subset of resources of the second resource configuration, first resource configuration, or other resources) may be set aside or otherwise identified as resources that sidelink devices wishing to perform sidelink communications using the second resource configuration may monitor in order to determine the availability of the second resource configuration. These resources may also be used by a sidelink device wishing to perform the sidelink communications to transmit their indication to transmit. In the non-limiting example illustrated in FIG. 4, resources for transmission indication 420 may be scheduled, allocated, or otherwise identified for three symbols and one subchannel of slot 405-*b* and slot 405-*d*, although other configurations may be used.

Figure 5:
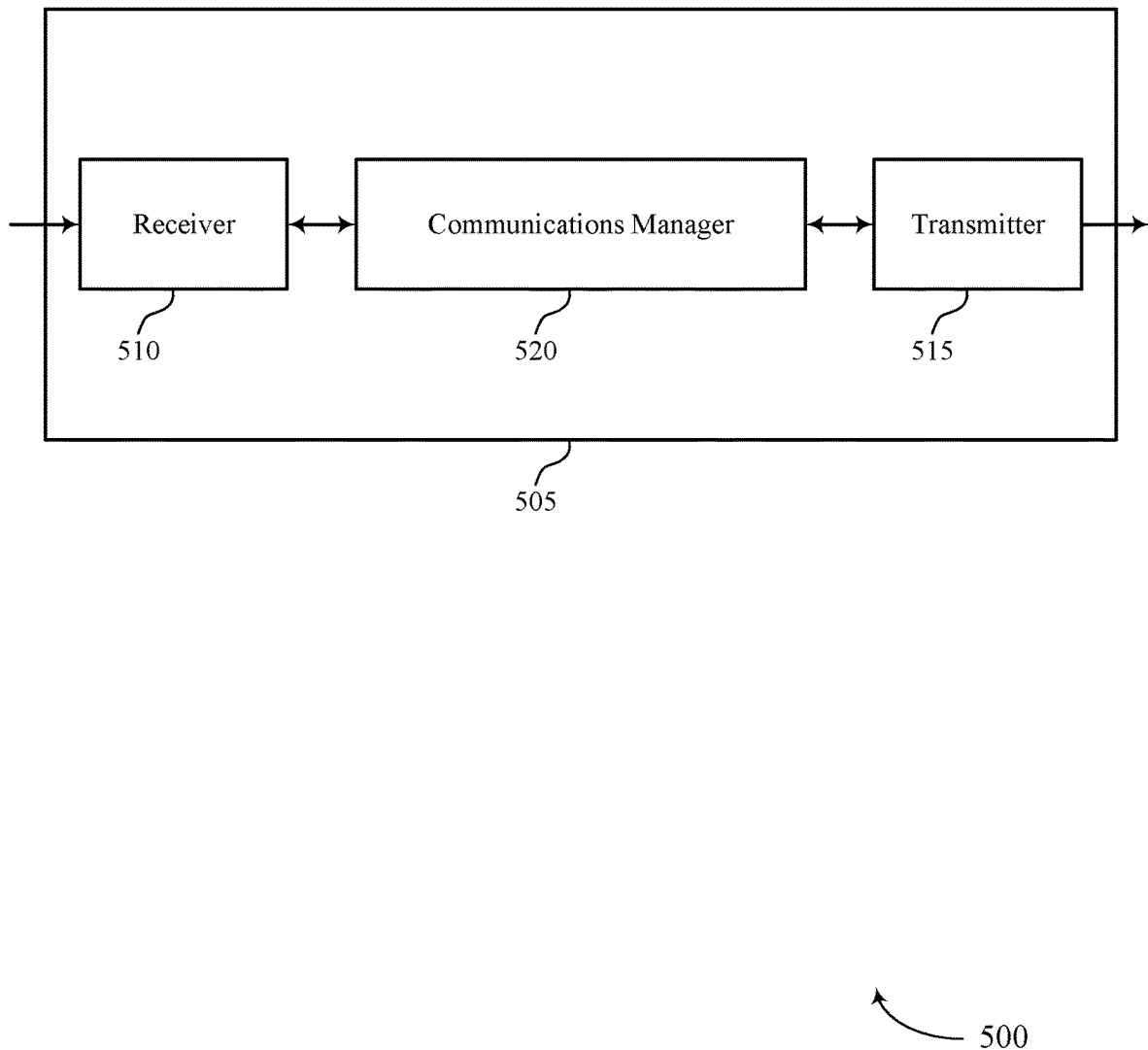
FIGS. 5 and 6 show block diagrams of devices that support sidelink feedback channel signaling in new radio sidelink in accordance with aspects of the present disclosure.

FIG. 5 shows a block diagram 500 of a device 505 that supports sidelink feedback channel signaling in new radio sidelink in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to sidelink feedback channel signaling in new radio sidelink). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to sidelink feedback channel signaling in new radio sidelink). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of sidelink feedback channel signaling in new radio sidelink as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for receiving sidelink communications from a second UE via a sidelink channel. The communications manager 520 may be configured as or otherwise support a means for transmitting a feedback message to the second UE via a sidelink feedback channel using a first resource configuration, the feedback message based on the sidelink communications. The communications manager 520 may be configured as or otherwise support a means for identifying a second resource configuration of the sidelink feedback channel associated with inter-UE communications via the sidelink feedback channel. The communications manager 520 may be configured as or otherwise support a means for performing the inter-UE communications with the second UE via the sidelink feedback channel using the second resource configuration of the sidelink feedback channel.

Additionally, or alternatively, the communications manager 520 may support wireless communication at a first UE in accordance with examples as disclosed herein. For example, the communications manager 520 may be configured as or otherwise support a means for transmitting sidelink communications to a second UE via a sidelink channel. The communications manager 520 may be configured as or otherwise support a means for receiving a feedback message from the second UE via a sidelink feedback channel using a first resource configuration, the feedback message based on the sidelink communications. The communications manager 520 may be configured as or otherwise support a means for identifying a second resource configuration of the sidelink feedback channel associated with inter-UE communications via the sidelink feedback channel. The communications manager 520 may be configured as or otherwise support a means for performing the inter-UE communications with the second UE via the sidelink feedback channel using the second resource configuration of the sidelink feedback channel.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for utilization of PSSCH resources reallocated to PSFCH resources to support sidelink control signaling via the PSFCH resources. This may enable a stand-alone SCI transmission within the sidelink network, rather than SCI transmissions linked to PSSCH sidelink data transmissions. This may improve sidelink resource utilization and efficiency.

Figure 6:
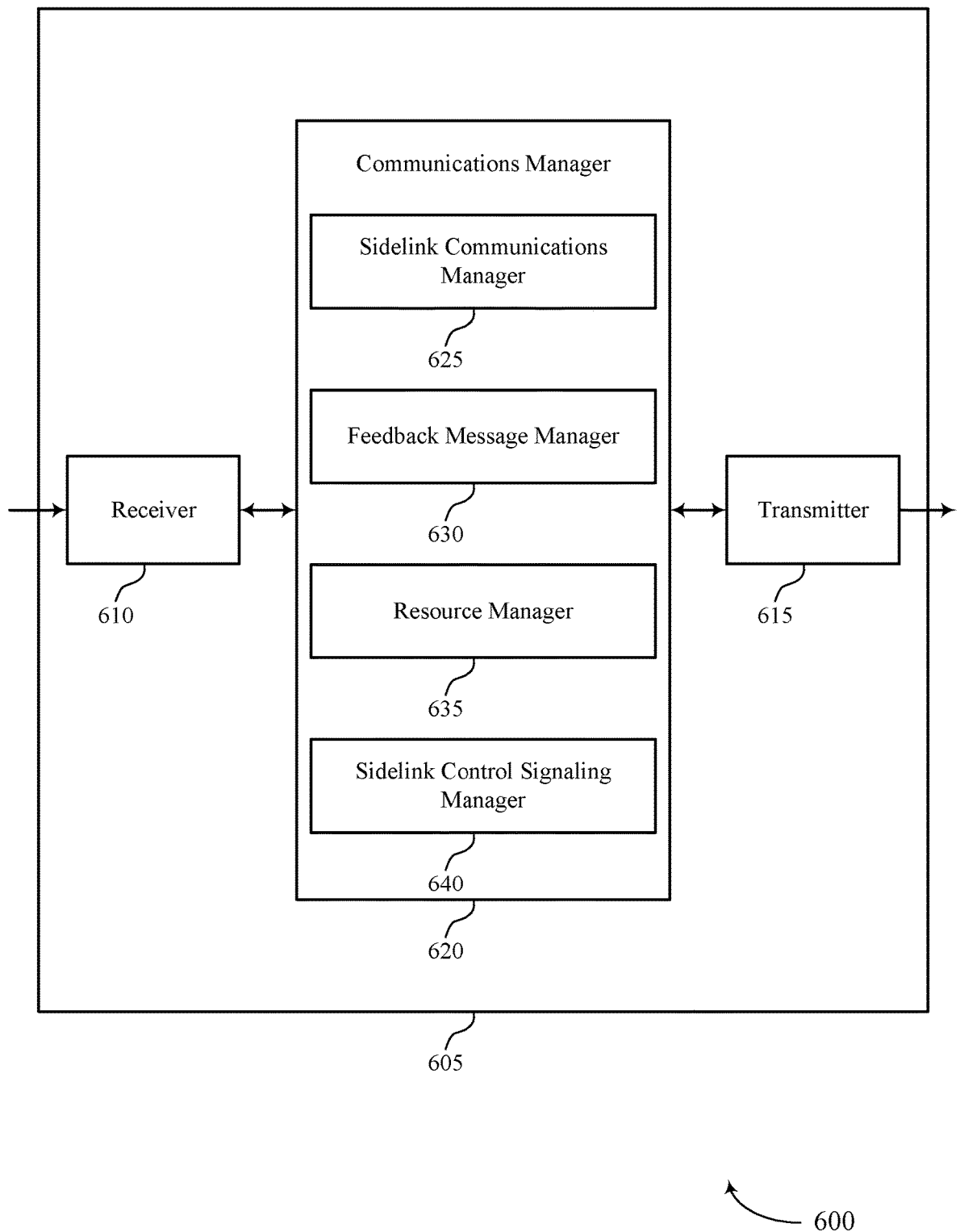

FIG. 6 shows a block diagram 600 of a device 605 that supports sidelink feedback channel signaling in new radio sidelink in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sidelink feedback channel signaling in new radio sidelink). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sidelink feedback channel signaling in new radio sidelink). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of sidelink feedback channel signaling in new radio sidelink as described herein. For example, the communications manager 620 may include a sidelink communications manager 625, a feedback message manager 630, a resource manager 635, a sidelink control signaling manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The sidelink communications manager 625 may be configured as or otherwise support a means for receiving sidelink communications from a second UE via a sidelink channel. The feedback message manager 630 may be configured as or otherwise support a means for transmitting a feedback message to the second UE via a sidelink feedback channel using a first resource configuration, the feedback message based on the sidelink communications. The resource manager 635 may be configured as or otherwise support a means for identifying a second resource configuration of the sidelink feedback channel associated with inter-UE communications via the sidelink feedback channel. The sidelink control signaling manager 640 may be configured as or otherwise support a means for performing the inter-UE communications with the second UE via the sidelink feedback channel using the second resource configuration of the sidelink feedback channel.

Additionally, or alternatively, the communications manager 620 may support wireless communication at a first UE in accordance with examples as disclosed herein. The sidelink communications manager 625 may be configured as or otherwise support a means for transmitting sidelink communications to a second UE via a sidelink channel. The feedback message manager 630 may be configured as or otherwise support a means for receiving a feedback message from the second UE via a sidelink feedback channel using a first resource configuration, the feedback message based on the sidelink communications. The resource manager 635 may be configured as or otherwise support a means for identifying a second resource configuration of the sidelink feedback channel associated with inter-UE communications via the sidelink feedback channel. The sidelink control signaling manager 640 may be configured as or otherwise support a means for performing the inter-UE communications with the second UE via the sidelink feedback channel using the second resource configuration of the sidelink feedback channel.

Figure 7:
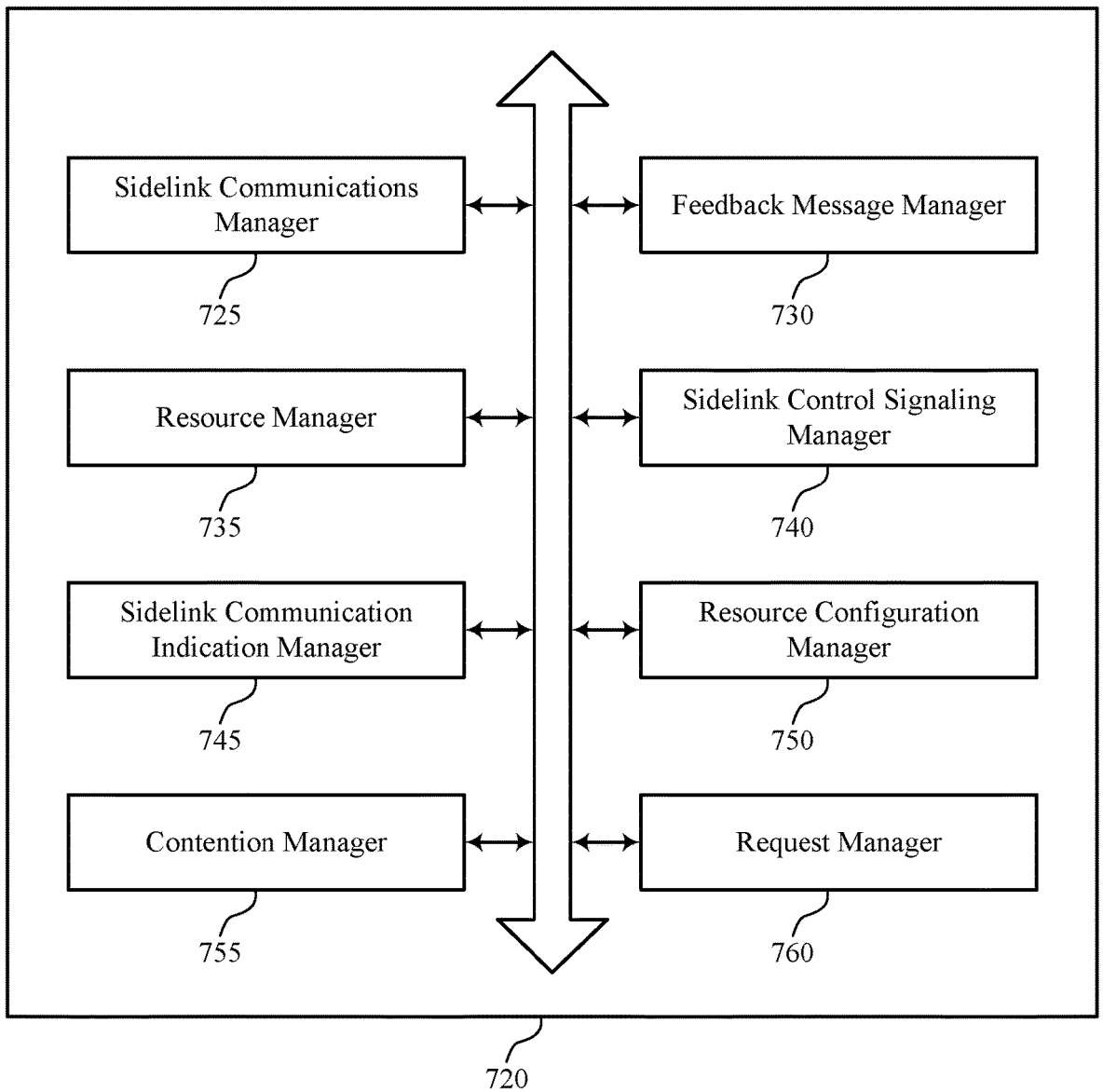
FIG. 7 shows a block diagram of a communications manager that supports sidelink feedback channel signaling in new radio sidelink in accordance with aspects of the present disclosure.

FIG. 7 shows a block diagram 700 of a communications manager 720 that supports sidelink feedback channel signaling in new radio sidelink in accordance with aspects of the present disclosure. The communications manager 720 may be an example of aspects of a communications manager 520, a communications manager 620, or both, as described herein. The communications manager 720, or various components thereof, may be an example of means for performing various aspects of sidelink feedback channel signaling in new radio sidelink as described herein. For example, the communications manager 720 may include a sidelink communications manager 725, a feedback message manager 730, a resource manager 735, a sidelink control signaling manager 740, a sidelink communication indication manager 745, a resource configuration manager 750, a contention manager 755, a request manager 760, or any combination thereof. Each of these components may communicate, directly or indirectly, with one another (e.g., via one or more buses).

The communications manager 720 may support wireless communication at a first UE in accordance with examples as disclosed herein. The sidelink communications manager 725 may be configured as or otherwise support a means for receiving sidelink communications from a second UE via a sidelink channel. The feedback message manager 730 may be configured as or otherwise support a means for transmitting a feedback message to the second UE via a sidelink feedback channel using a first resource configuration, the feedback message based on the sidelink communications. The resource manager 735 may be configured as or otherwise support a means for identifying a second resource configuration of the sidelink feedback channel associated with inter-UE communications via the sidelink feedback channel. The sidelink control signaling manager 740 may be configured as or otherwise support a means for performing the inter-UE communications with the second UE via the sidelink feedback channel using the second resource configuration of the sidelink feedback channel.

In some examples, the sidelink communication indication manager 745 may be configured as or otherwise support a means for receiving, from the second UE, a different UE, or both, an indication that inter-UE communications will be performed via the sidelink feedback channel using the second resource configuration.

In some examples, the resource configuration manager 750 may be configured as or otherwise support a means for receiving a signal from the second UE, a different UE, a base station, or any combination thereof, configuring the second resource configuration.

In some examples, the sidelink communications manager 725 may be configured as or otherwise support a means for multiplexing the feedback message with the inter-UE communications via the sidelink feedback channel.

In some examples, the sidelink communications manager 725 may be configured as or otherwise support a means for transmitting the feedback message via the sidelink feedback channel separately from the inter-UE communications via the sidelink feedback channel.

In some examples, to support performing the inter-UE communications, the contention manager 755 may be configured as or otherwise support a means for transmitting, based on a contention-free channel access procedure, the inter-UE communications via the sidelink feedback channel.

In some examples, to support performing the inter-UE communications, the contention manager 755 may be configured as or otherwise support a means for performing a channel access procedure on the sidelink feedback channel. In some examples, to support performing the inter-UE communications, the contention manager 755 may be configured as or otherwise support a means for performing the inter-UE communications via the sidelink feedback channel based on a result of the channel access procedure.

In some examples, to support performing the inter-UE communications, the contention manager 755 may be configured as or otherwise support a means for monitoring for a sidelink control information message indicating that inter-UE communications are to be performed via the sidelink feedback channel. In some examples, to support performing the inter-UE communications, the contention manager 755 may be configured as or otherwise support a means for performing the inter-UE communications via the sidelink feedback channel based on a result of the monitoring.

In some examples, to support performing the inter-UE communications, the request manager 760 may be configured as or otherwise support a means for transmitting a sidelink control information message indicating that the first UE is to perform inter-UE communications via the sidelink feedback channel. In some examples, to support performing the inter-UE communications, the request manager 760 may be configured as or otherwise support a means for performing the inter-UE communications via the sidelink feedback channel based on the sidelink control information message.

In some examples, to support performing the inter-UE communications via the sidelink feedback channel, the sidelink communications manager 725 may be configured as or otherwise support a means for transmitting, receiving, or both, the inter-UE communications via the sidelink feedback channel.

Additionally, or alternatively, the communications manager 720 may support wireless communication at a first UE in accordance with examples as disclosed herein. In some examples, the sidelink communications manager 725 may be configured as or otherwise support a means for transmitting sidelink communications to a second UE via a sidelink channel. In some examples, the feedback message manager 730 may be configured as or otherwise support a means for receiving a feedback message from the second UE via a sidelink feedback channel using a first resource configuration, the feedback message based on the sidelink communications. In some examples, the resource manager 735 may be configured as or otherwise support a means for identifying a second resource configuration of the sidelink feedback channel associated with inter-UE communications via the sidelink feedback channel. In some examples, the sidelink control signaling manager 740 may be configured as or otherwise support a means for performing the inter-UE communications with the second UE via the sidelink feedback channel using the second resource configuration of the sidelink feedback channel.

In some examples, the sidelink communication indication manager 745 may be configured as or otherwise support a means for transmitting, to the second UE, a different UE, or both, an indication that inter-UE communications will be performed via the sidelink feedback channel using the second resource configuration.

In some examples, the resource configuration manager 750 may be configured as or otherwise support a means for transmitting a signal to the second UE, a different UE, a base station, or any combination thereof, configuring the second resource configuration.

In some examples, the feedback message is multiplexed with the inter-UE communications via the sidelink feedback channel.

In some examples, the sidelink communications manager 725 may be configured as or otherwise support a means for receiving the feedback message via the sidelink feedback channel separately from the inter-UE communications via the sidelink feedback channel.

In some examples, to support performing the inter-UE communications, the sidelink communications manager 725 may be configured as or otherwise support a means for transmitting, based on a contention-free channel access procedure, the inter-UE communications via the sidelink feedback channel.

In some examples, to support performing the inter-UE communications, the contention manager 755 may be configured as or otherwise support a means for performing a channel access procedure on the sidelink feedback channel. In some examples, to support performing the inter-UE communications, the contention manager 755 may be configured as or otherwise support a means for performing the inter-UE communications via the sidelink feedback channel based on a result of the channel access procedure.

In some examples, to support performing the inter-UE communications, the sidelink communication indication manager 745 may be configured as or otherwise support a means for transmitting a sidelink control information message indicating that inter-UE communications are to be performed via the sidelink feedback channel. In some examples, to support performing the inter-UE communications, the sidelink communication indication manager 745 may be configured as or otherwise support a means for performing the inter-UE communications via the sidelink feedback channel based on a result of the sidelink control information message.

In some examples, to support performing the inter-UE communications, the request manager 760 may be configured as or otherwise support a means for receiving a sidelink control information message indicating that the second UE is to perform inter-UE communications via the sidelink feedback channel. In some examples, to support performing the inter-UE communications, the request manager 760 may be configured as or otherwise support a means for performing the inter-UE communications via the sidelink feedback channel based on the sidelink control information message.

In some examples, to support performing the inter-UE communications via the sidelink feedback channel, the sidelink communications manager 725 may be configured as or otherwise support a means for transmitting, receiving, or both, the inter-UE communications via the sidelink feedback channel.

Figure 8:
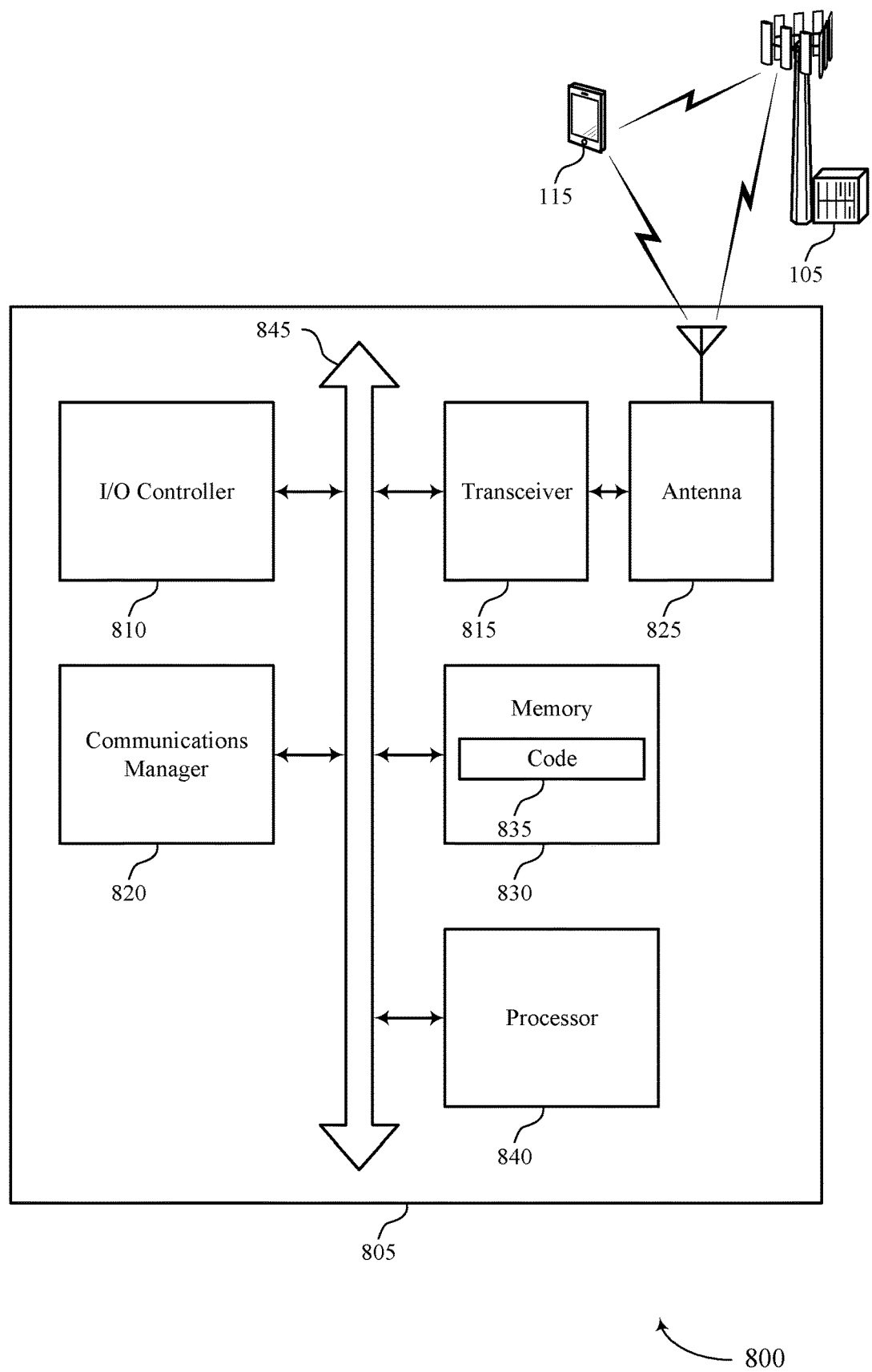
FIG. 8 shows a diagram of a system including a device that supports sidelink feedback channel signaling in new radio sidelink in accordance with aspects of the present disclosure.

FIG. 8 shows a diagram of a system 800 including a device 805 that supports sidelink feedback channel signaling in new radio sidelink in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting sidelink feedback channel signaling in new radio sidelink). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving sidelink communications from a second UE via a sidelink channel. The communications manager 820 may be configured as or otherwise support a means for transmitting a feedback message to the second UE via a sidelink feedback channel using a first resource configuration, the feedback message based on the sidelink communications. The communications manager 820 may be configured as or otherwise support a means for identifying a second resource configuration of the sidelink feedback channel associated with inter-UE communications via the sidelink feedback channel. The communications manager 820 may be configured as or otherwise support a means for performing the inter-UE communications with the second UE via the sidelink feedback channel using the second resource configuration of the sidelink feedback channel.

Additionally, or alternatively, the communications manager 820 may support wireless communication at a first UE in accordance with examples as disclosed herein. For example, the communications manager 820 may be configured as or otherwise support a means for transmitting sidelink communications to a second UE via a sidelink channel. The communications manager 820 may be configured as or otherwise support a means for receiving a feedback message from the second UE via a sidelink feedback channel using a first resource configuration, the feedback message based on the sidelink communications. The communications manager 820 may be configured as or otherwise support a means for identifying a second resource configuration of the sidelink feedback channel associated with inter-UE communications via the sidelink feedback channel. The communications manager 820 may be configured as or otherwise support a means for performing the inter-UE communications with the second UE via the sidelink feedback channel using the second resource configuration of the sidelink feedback channel.

By including or configuring the communications manager 820 in accordance with examples as described herein, the device 805 may support techniques for utilization of PSSCH resources reallocated to PSFCH resources to support sidelink control signaling via the PSFCH resources. This may enable a stand-alone SCI transmission within the sidelink network, rather than SCI transmissions linked to PSSCH sidelink data transmissions. This may improve sidelink resource utilization and efficiency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of sidelink feedback channel signaling in new radio sidelink as described herein, or the processor 840 and the memory 830 may be otherwise configured to perform or support such operations.

Figure 9:
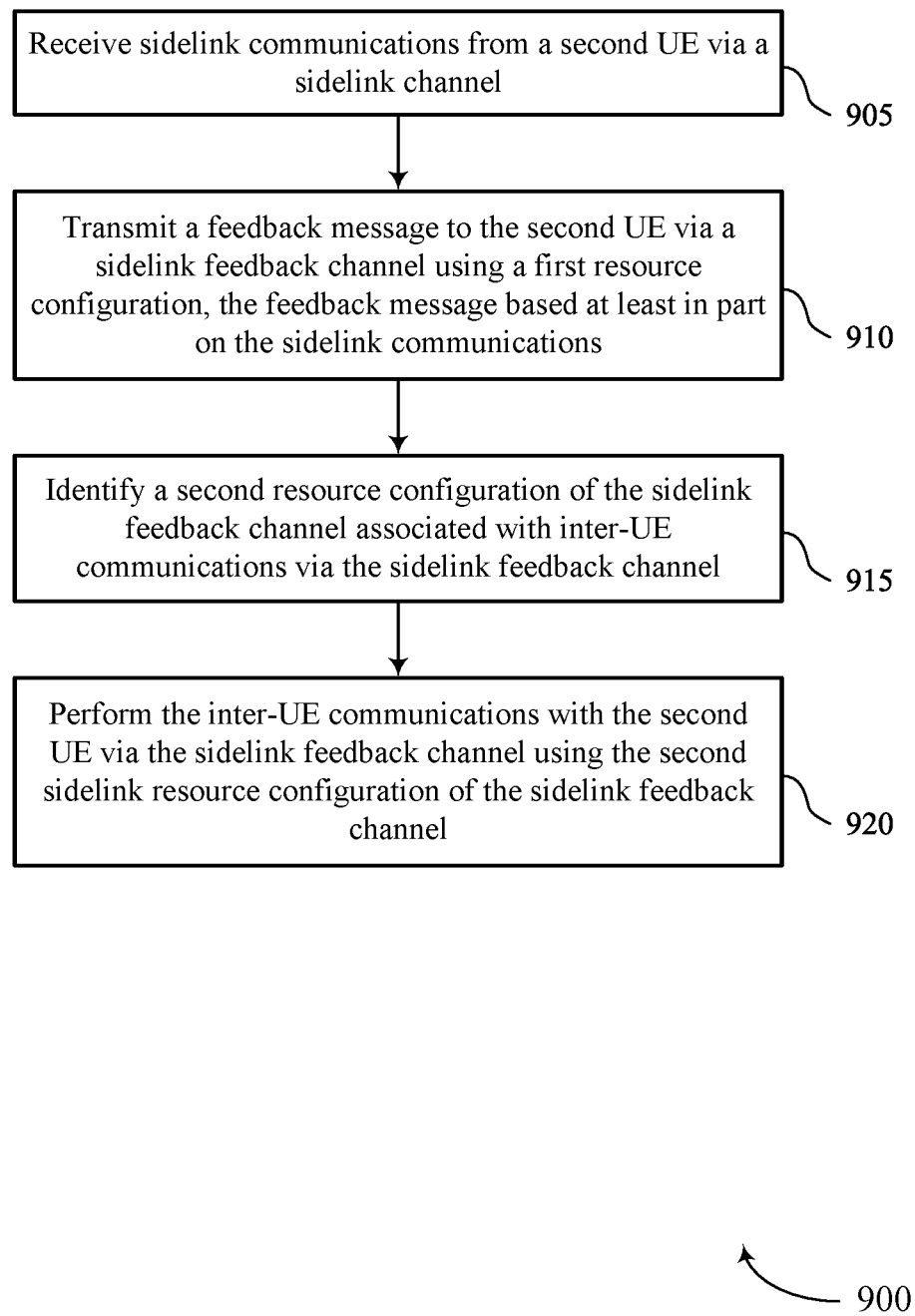
FIGS. 9 through 13 show flowcharts illustrating methods that support sidelink feedback channel signaling in new radio sidelink in accordance with aspects of the present disclosure.

FIG. 9 shows a flowchart illustrating a method 900 that supports sidelink feedback channel signaling in new radio sidelink in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving sidelink communications from a second UE via a sidelink channel. The operations of 905 may be performed in accordance with examples as disclosed herein. In some examples, aspects of the operations of 905 may be performed by a sidelink communications manager 725 as described with reference to FIG. 7.

At 910, the method may include transmitting a feedback message to the second UE via a sidelink feedback channel using a first resource configuration, the feedback message based on the sidelink communications. The operations of 910 may be performed in accordance with examples as disclosed herein. In some examples, aspects of the operations of 910 may be performed by a feedback message manager 730 as described with reference to FIG. 7.

At 915, the method may include identifying a second resource configuration of the sidelink feedback channel associated with inter-UE communications via the sidelink feedback channel. The operations of 915 may be performed in accordance with examples as disclosed herein. In some examples, aspects of the operations of 915 may be performed by a resource manager 735 as described with reference to FIG. 7.

At 920, the method may include performing the inter-UE communications with the second UE via the sidelink feedback channel using the second resource configuration of the sidelink feedback channel. The operations of 920 may be performed in accordance with examples as disclosed herein. In some examples, aspects of the operations of 920 may be performed by a sidelink control signaling manager 740 as described with reference to FIG. 7.

Figure 10:
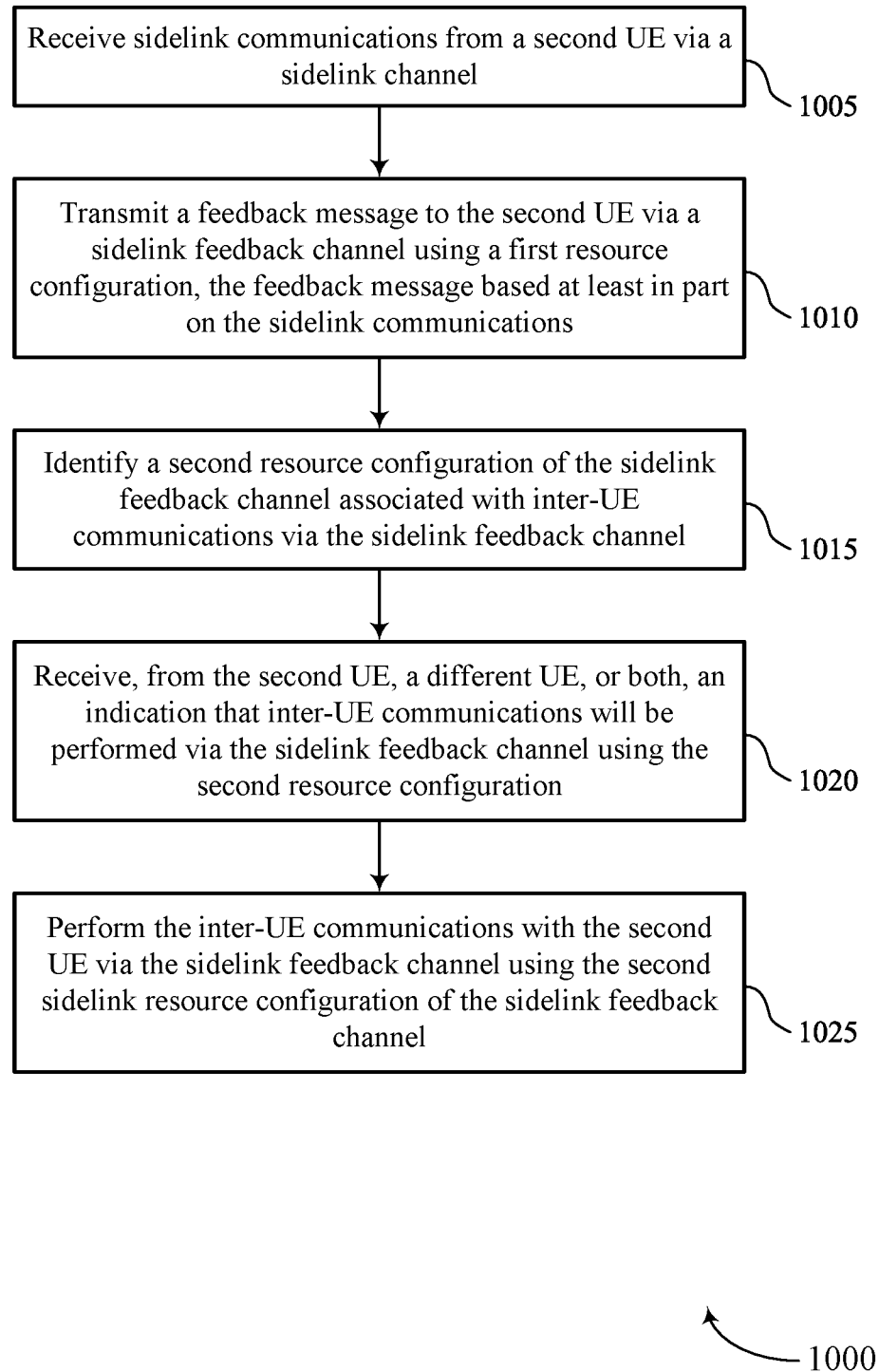

FIG. 10 shows a flowchart illustrating a method 1000 that supports sidelink feedback channel signaling in new radio sidelink in accordance with aspects of the present disclosure.

The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving sidelink communications from a second UE via a sidelink channel. The operations of 1005 may be performed in accordance with examples as disclosed herein. In some examples, aspects of the operations of 1005 may be performed by a sidelink communications manager 725 as described with reference to FIG. 7.

At 1010, the method may include transmitting a feedback message to the second UE via a sidelink feedback channel using a first resource configuration, the feedback message based on the sidelink communications. The operations of 1010 may be performed in accordance with examples as disclosed herein. In some examples, aspects of the operations of 1010 may be performed by a feedback message manager 730 as described with reference to FIG. 7.

At 1015, the method may include identifying a second resource configuration of the sidelink feedback channel associated with inter-UE communications via the sidelink feedback channel. The operations of 1015 may be performed in accordance with examples as disclosed herein. In some examples, aspects of the operations of 1015 may be performed by a resource manager 735 as described with reference to FIG. 7.

At 1020, the method may include receiving, from the second UE, a different UE, or both, an indication that inter-UE communications will be performed via the sidelink feedback channel using the second resource configuration. The operations of 1020 may be performed in accordance with examples as disclosed herein. In some examples, aspects of the operations of 1020 may be performed by a sidelink communication indication manager 745 as described with reference to FIG. 7.

At 1025, the method may include performing the inter-UE communications with the second UE via the sidelink feedback channel using the second resource configuration of the sidelink feedback channel. The operations of 1025 may be performed in accordance with examples as disclosed herein. In some examples, aspects of the operations of 1025 may be performed by a sidelink control signaling manager 740 as described with reference to FIG. 7.

Figure 11:
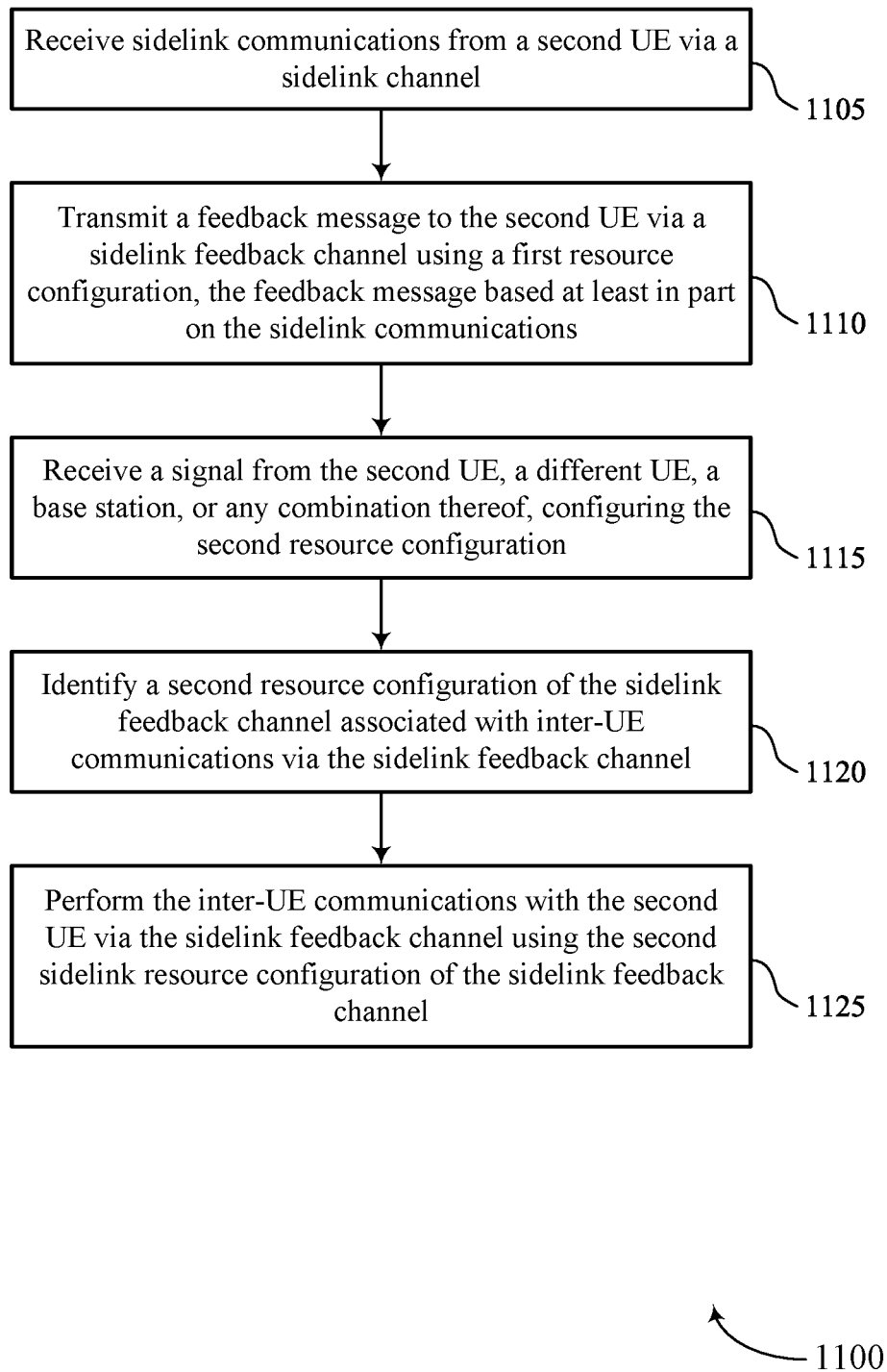

FIG. 11 shows a flowchart illustrating a method 1100 that supports sidelink feedback channel signaling in new radio sidelink in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include receiving sidelink communications from a second UE via a sidelink channel. The operations of 1105 may be performed in accordance with examples as disclosed herein. In some examples, aspects of the operations of 1105 may be performed by a sidelink communications manager 725 as described with reference to FIG. 7.

At 1110, the method may include transmitting a feedback message to the second UE via a sidelink feedback channel using a first resource configuration, the feedback message based on the sidelink communications. The operations of 1110 may be performed in accordance with examples as disclosed herein. In some examples, aspects of the operations of 1110 may be performed by a feedback message manager 730 as described with reference to FIG. 7.

At 1115, the method may include receiving a signal from the second UE, a different UE, a base station, or any combination thereof, configuring the second resource configuration. The operations of 1115 may be performed in accordance with examples as disclosed herein. In some examples, aspects of the operations of 1115 may be performed by a resource configuration manager 750 as described with reference to FIG. 7.

At 1120, the method may include identifying a second resource configuration of the sidelink feedback channel associated with inter-UE communications via the sidelink feedback channel. The operations of 1120 may be performed in accordance with examples as disclosed herein. In some examples, aspects of the operations of 1120 may be performed by a resource manager 735 as described with reference to FIG. 7.

At 1125, the method may include performing the inter-UE communications with the second UE via the sidelink feedback channel using the second resource configuration of the sidelink feedback channel. The operations of 1125 may be performed in accordance with examples as disclosed herein. In some examples, aspects of the operations of 1125 may be performed by a sidelink control signaling manager 740 as described with reference to FIG. 7.

Figure 12:
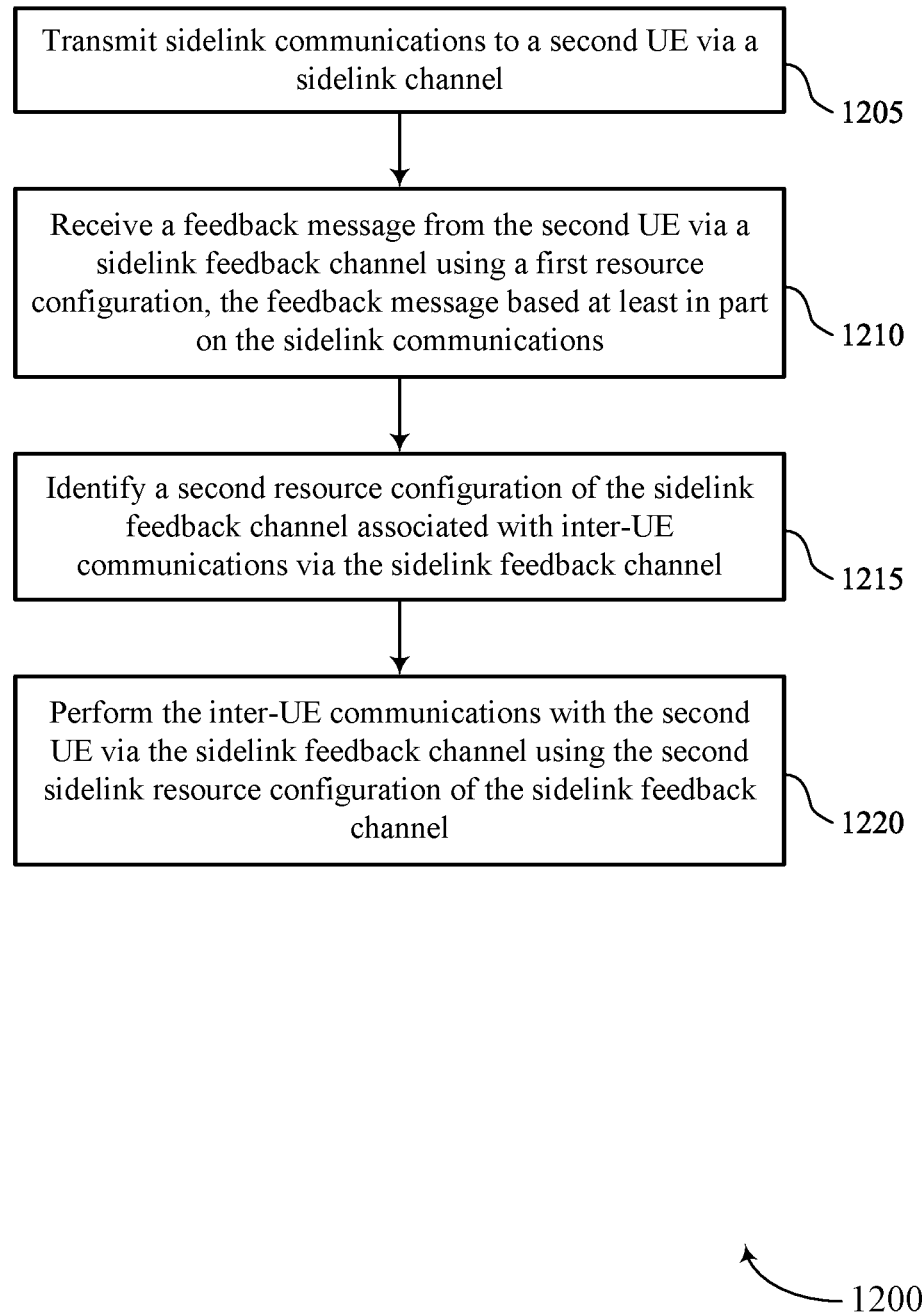

FIG. 12 shows a flowchart illustrating a method 1200 that supports sidelink feedback channel signaling in new radio sidelink in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include transmitting sidelink communications to a second UE via a sidelink channel. The operations of 1205 may be performed in accordance with examples as disclosed herein. In some examples, aspects of the operations of 1205 may be performed by a sidelink communications manager 725 as described with reference to FIG. 7.

At 1210, the method may include receiving a feedback message from the second UE via a sidelink feedback channel using a first resource configuration, the feedback message based on the sidelink communications. The operations of 1210 may be performed in accordance with examples as disclosed herein. In some examples, aspects of the operations of 1210 may be performed by a feedback message manager 730 as described with reference to FIG. 7.

At 1215, the method may include identifying a second resource configuration of the sidelink feedback channel associated with inter-UE communications via the sidelink feedback channel. The operations of 1215 may be performed in accordance with examples as disclosed herein. In some examples, aspects of the operations of 1215 may be performed by a resource manager 735 as described with reference to FIG. 7.

At 1220, the method may include performing the inter-UE communications with the second UE via the sidelink feedback channel using the second resource configuration of the sidelink feedback channel. The operations of 1220 may be performed in accordance with examples as disclosed herein. In some examples, aspects of the operations of 1220 may be performed by a sidelink control signaling manager 740 as described with reference to FIG. 7.

Figure 13:
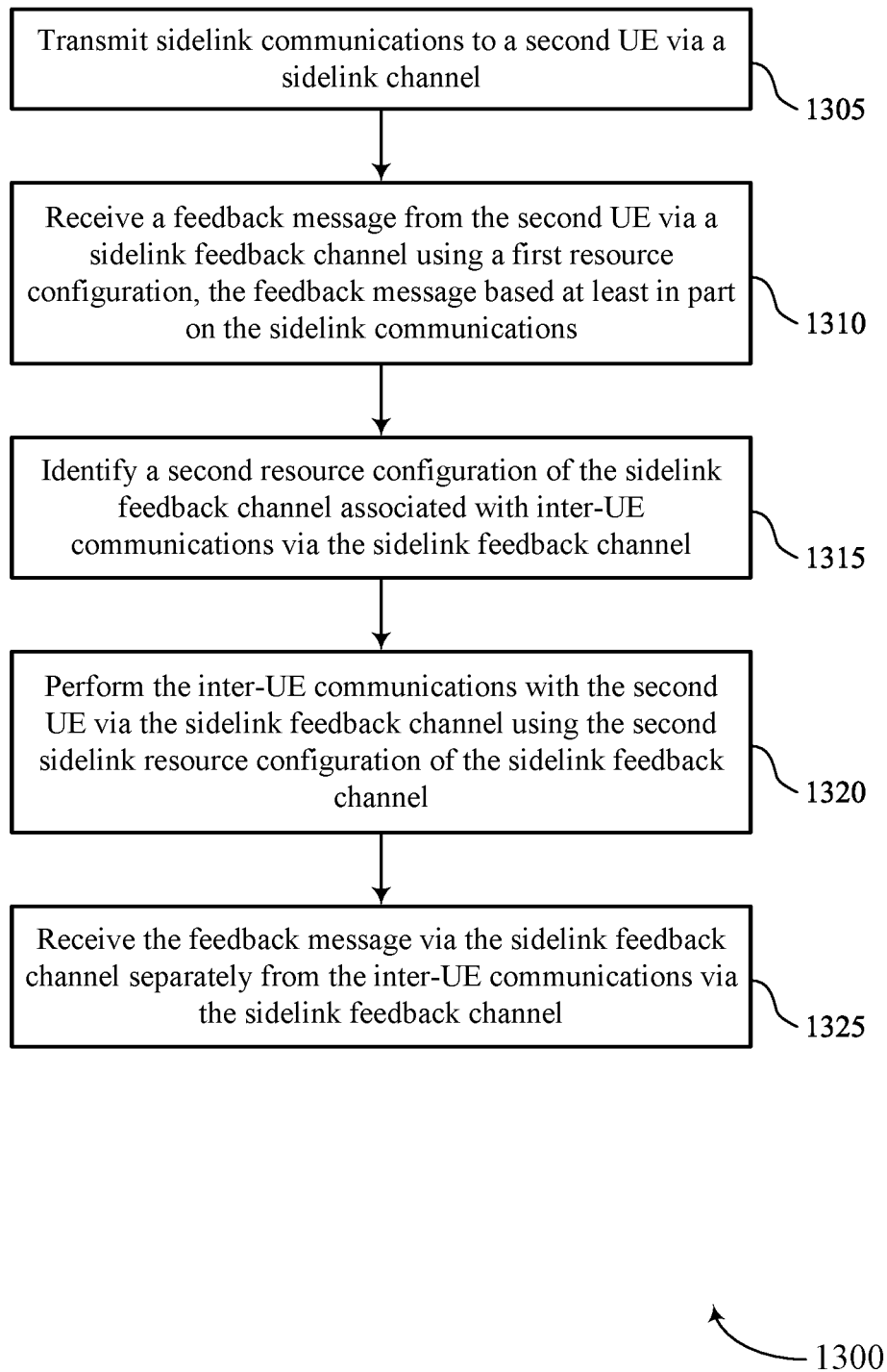

FIG. 13 shows a flowchart illustrating a method 1300 that supports sidelink feedback channel signaling in new radio sidelink in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting sidelink communications to a second UE via a sidelink channel. The operations of 1305 may be performed in accordance with examples as disclosed herein. In some examples, aspects of the operations of 1305 may be performed by a sidelink communications manager 725 as described with reference to FIG. 7.

At 1310, the method may include receiving a feedback message from the second UE via a sidelink feedback channel using a first resource configuration, the feedback message based on the sidelink communications. The operations of 1310 may be performed in accordance with examples as disclosed herein. In some examples, aspects of the operations of 1310 may be performed by a feedback message manager 730 as described with reference to FIG. 7.

At 1315, the method may include identifying a second resource configuration of the sidelink feedback channel associated with inter-UE communications via the sidelink feedback channel. The operations of 1315 may be performed in accordance with examples as disclosed herein. In some examples, aspects of the operations of 1315 may be performed by a resource manager 735 as described with reference to FIG. 7.

At 1320, the method may include performing the inter-UE communications with the second UE via the sidelink feedback channel using the second resource configuration of the sidelink feedback channel. The operations of 1320 may be performed in accordance with examples as disclosed herein. In some examples, aspects of the operations of 1320 may be performed by a sidelink control signaling manager 740 as described with reference to FIG. 7.

At 1325, the method may include receiving the feedback message via the sidelink feedback channel separately from the inter-UE communications via the sidelink feedback channel. The operations of 1325 may be performed in accordance with examples as disclosed herein. In some examples, aspects of the operations of 1325 may be performed by a sidelink communications manager 725 as described with reference to FIG. 7.

The following provides an overview of aspects of the present disclosure:

Aspect 1: A method for wireless communication at a first UE, comprising: receiving sidelink communications from a second UE via a sidelink channel; transmitting a feedback message to the second UE via a sidelink feedback channel using a first resource configuration, the feedback message based at least in part on the sidelink communications; identifying a second resource configuration of the sidelink feedback channel associated with inter-UE communications via the sidelink feedback channel; and performing the inter-UE communications with the second UE via the sidelink feedback channel using the second resource configuration of the sidelink feedback channel.

Aspect 2: The method of aspect 1, further comprising: receiving, from the second UE, a different UE, or both, an indication that inter-UE communications will be performed via the sidelink feedback channel using the second resource configuration.

Aspect 3: The method of any of aspects 1 through 2, further comprising: receiving a signal from the second UE, a different UE, a base station, or any combination thereof, configuring the second resource configuration.

Aspect 4: The method of any of aspects 1 through 3, further comprising: multiplexing the feedback message with the inter-UE communications via the sidelink feedback channel.

Aspect 5: The method of any of aspects 1 through 4, further comprising: transmitting the feedback message via the sidelink feedback channel separately from the inter-UE communications via the sidelink feedback channel.

Aspect 6: The method of any of aspects 1 through 5, wherein performing the inter-UE communications comprises: transmitting, based at least in part on a contention-free channel access procedure, the inter-UE communications via the sidelink feedback channel.

Aspect 7: The method of any of aspects 1 through 6, wherein performing the inter-UE communications comprises: performing a channel access procedure on the sidelink feedback channel; and performing the inter-UE communications via the sidelink feedback channel based at least in part on a result of the channel access procedure.

Aspect 8: The method of any of aspects 1 through 7, wherein performing the inter-UE communications comprises: monitoring for a sidelink control information message indicating that inter-UE communications are to be performed via the sidelink feedback channel; and performing the inter-UE communications via the sidelink feedback channel based at least in part on a result of the monitoring.

Aspect 9: The method of any of aspects 1 through 8, wherein performing the inter-UE communications comprises: transmitting a sidelink control information message indicating that the first UE is to perform inter-UE communications via the sidelink feedback channel; and performing the inter-UE communications via the sidelink feedback channel based at least in part on the sidelink control information message.

Aspect 10: The method of any of aspects 1 through 9, wherein performing the inter-UE communications via the sidelink feedback channel comprises: transmitting, receiving, or both, the inter-UE communications via the sidelink feedback channel.

Aspect 11: A method for wireless communication at a first UE, comprising: transmitting sidelink communications to a second UE via a sidelink channel; receiving a feedback message from the second UE via a sidelink feedback channel using a first resource configuration, the feedback message based at least in part on the sidelink communications; identifying a second resource configuration of the sidelink feedback channel associated with inter-UE communications via the sidelink feedback channel; and performing the inter-UE communications with the second UE via the sidelink feedback channel using the second resource configuration of the sidelink feedback channel.

Aspect 12: The method of aspect 11, further comprising: transmitting, to the second UE, a different UE, or both, an indication that inter-UE communications will be performed via the sidelink feedback channel using the second resource configuration.

Aspect 13: The method of any of aspects 11 through 12, further comprising: transmitting a signal to the second UE, a different UE, a base station, or any combination thereof, configuring the second resource configuration.

Aspect 14: The method of any of aspects 11 through 13, wherein the feedback message is multiplexed with the inter-UE communications via the sidelink feedback channel.

Aspect 15: The method of any of aspects 11 through 14, further comprising: receiving the feedback message via the sidelink feedback channel separately from the inter-UE communications via the sidelink feedback channel.

Aspect 16: The method of any of aspects 11 through 15, wherein performing the inter-UE communications comprises: transmitting, based at least in part on a contention-free channel access procedure, the inter-UE communications via the sidelink feedback channel.

Aspect 17: The method of any of aspects 11 through 16, wherein performing the inter-UE communications comprises: performing a channel access procedure on the sidelink feedback channel; and performing the inter-UE communications via the sidelink feedback channel based at least in part on a result of the channel access procedure.

Aspect 18: The method of any of aspects 11 through 17, wherein performing the inter-UE communications comprises: transmitting a sidelink control information message indicating that inter-UE communications are to be performed via the sidelink feedback channel; and performing the inter-UE communications via the sidelink feedback channel based at least in part on a result of the sidelink control information message.

Aspect 19: The method of any of aspects 11 through 18, wherein performing the inter-UE communications comprises: receiving a sidelink control information message indicating that the second UE is to perform inter-UE communications via the sidelink feedback channel; and performing the inter-UE communications via the sidelink feedback channel based at least in part on the sidelink control information message.

Aspect 20: The method of any of aspects 11 through 19, wherein performing the inter-UE communications via the sidelink feedback channel comprises: transmitting, receiving, or both, the inter-UE communications via the sidelink feedback channel.

Aspect 21: An apparatus for wireless communication at a first UE, comprising a processor; memory coupled with the processor; and instructions stored in the memory and executable by the processor to cause the apparatus to perform a method of any of aspects 1 through 10.

Aspect 22: An apparatus for wireless communication at a first UE, comprising at least one means for performing a method of any of aspects 1 through 10.

Aspect 23: A non-transitory computer-readable medium storing code for wireless communication at a first UE, the code comprising instructions executable by a processor to perform a method of any of aspects 1 through 10.

Aspect 24: An apparatus for wireless communication at a first UE, comprising a processor; memory coupled with the processor; and instructions stored in the memory and executable by the processor to cause the apparatus to perform a method of any of aspects 11 through 20.

Aspect 25: An apparatus for wireless communication at a first UE, comprising at least one means for performing a method of any of aspects 11 through 20.

Aspect 26: A non-transitory computer-readable medium storing code for wireless communication at a first UE, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving sidelink communications from a second UE via a sidelink channel;
   transmitting a feedback message to the second UE via a sidelink feedback channel using a first resource configuration, wherein the first resource configuration indicates a first set of one or more sidelink feedback channel resources, the feedback message being based at least in part on the sidelink communications, and wherein the first set of one or more sidelink feedback channel resources is associated with a first set of subchannels of a frequency band and a quantity of cyclic shifting pairs for the sidelink feedback channel; and
   performing inter-UE coordination using a second resource configuration, wherein the second resource configuration indicates a second set of one or more sidelink feedback channel resources, the second set of one or more sidelink feedback channel resources different from the first set of one or more sidelink feedback channel resources and associated with a second set of subchannels of the frequency band, and wherein the feedback message is multiplexed with inter-UE coordination signaling using the first set of one or more sidelink feedback channel resources and the second set of one or more sidelink feedback channel resources.

2. The method of claim 1, further comprising:
   receiving an indication that the inter-UE coordination will be performed using the second resource configuration.

3. The method of claim 1, further comprising:
   receiving a signal configuring the second resource configuration.

4. The method of claim 1, further comprising:
   transmitting the feedback message via the sidelink feedback channel separately from the inter-UE coordination.

5. The method of claim 1, wherein performing the inter-UE coordination comprises:
   transmitting, based at least in part on a contention-free channel access procedure, the inter-UE coordination.

6. The method of claim 1, wherein performing the inter-UE coordination comprises:
   performing a channel access procedure on the sidelink channel; and
   performing the inter-UE coordination based at least in part on a result of the channel access procedure.

7. The method of claim 1, wherein performing the inter-UE coordination comprises:
   monitoring for a sidelink control information message indicating that the inter-UE coordination is to be performed; and
   performing the inter-UE coordination based at least in part on a result of the monitoring.

8. The method of claim 1, wherein performing the inter-UE coordination comprises:
   transmitting a sidelink control information message indicating that the first UE is to perform the inter-UE coordination; and
   performing the inter-UE coordination based at least in part on the sidelink control information message.

9. The method of claim 1, wherein performing the inter-UE coordination via the sidelink feedback channel comprises:
transmitting, receiving, or both, the inter-UE coordination via the sidelink feedback channel.

10. A method for wireless communication at a first user equipment (UE), comprising:
transmitting sidelink communications to a second UE via a sidelink channel;
receiving a feedback message from the second UE via a sidelink feedback channel using a first resource configuration that indicates a first set of one or more sidelink feedback channel resources, the feedback message being based at least in part on the sidelink communications, and wherein the first set of one or more sidelink feedback channel resources is associated with a first set of subchannels of a frequency band and a quantity of cyclic shifting pairs for the sidelink feedback channel; and
performing inter-UE coordination using a second resource configuration, wherein the second resource configuration indicates a second set of one or more sidelink feedback channel resources, the second set of one or more sidelink feedback channel resources different from the first set of one or more sidelink feedback channel resources and associated with a second set of subchannels of the frequency band, and wherein the feedback message is multiplexed with inter-UE coordination signaling using the first set of one or more sidelink feedback channel resources and the second set of one or more sidelink feedback channel resources.

11. The method of claim 10, further comprising:
transmitting an indication that the inter-UE coordination will be performed via the sidelink feedback channel using the second resource configuration.

12. The method of claim 10, further comprising:
transmitting a signal configuring the second resource configuration.

13. The method of claim 10, further comprising:
receiving the feedback message via the sidelink feedback channel separately from the inter-UE coordination.

14. The method of claim 10, wherein performing the inter-UE coordination comprises:
transmitting, based at least in part on a contention-free channel access procedure, the inter-UE coordination.

15. The method of claim 10, wherein performing the inter-UE coordination comprises:
performing a channel access procedure on the sidelink channel; and
performing the inter-UE coordination via the sidelink feedback channel based at least in part on a result of the channel access procedure.

16. The method of claim 10, wherein performing the inter-UE coordination comprises:
transmitting a sidelink control information message indicating that the inter-UE coordination is to be performed via the sidelink feedback channel; and
performing the inter-UE coordination via the sidelink feedback channel based at least in part on a result of the sidelink control information message.

17. The method of claim 10, wherein performing the inter-UE coordination comprises:
receiving a sidelink control information message indicating that the second UE is to perform the inter-UE coordination via the sidelink feedback channel; and
performing the inter-UE coordination via the sidelink feedback channel based at least in part on the sidelink control information message.

18. The method of claim 10, wherein performing the inter-UE coordination via the sidelink feedback channel comprises:
transmitting, receiving, or both, the inter-UE coordination via the sidelink feedback channel.

19. An apparatus for wireless communication at a first user equipment (UE), comprising:
one or more processors;
one or more memories coupled with the one or more processors; and
one or more processor-readable instructions stored in the one or more memories and executable by the one or more processors, individually or collectively, to cause the apparatus to:
receive sidelink communications from a second UE via a sidelink channel;
transmit a feedback message to the second UE via a sidelink feedback channel using a first resource configuration, wherein the first resource configuration indicates a first set of one or more sidelink feedback channel resources, the feedback message being based at least in part on the sidelink communications, and wherein the first set of one or more sidelink feedback channel resources is associated with a first set of subchannels of a frequency band and a quantity of cyclic shifting pairs for the sidelink feedback channel; and
perform inter-UE coordination using a second resource configuration, wherein the second resource configuration indicates a second set of one or more sidelink feedback channel resources, the second set of one or more sidelink feedback channel resources different from the first set of one or more sidelink feedback channel resources and associated with a second set of subchannels of the frequency band, and wherein the feedback message is multiplexed with inter-UE coordination signaling using the first set of one or more sidelink feedback channel resources and the second set of one or more sidelink feedback channel resources.

20. The apparatus of claim 19, wherein the one or more processor-readable instructions are further executable by the one or more processors to cause the apparatus to:
receive an indication that the inter-UE coordination will be performed using the second resource configuration.

21. The apparatus of claim 19, wherein the one or more processor-readable instructions are further executable by the one or more processors to cause the apparatus to:
receive a signal configuring the second resource configuration.

22. The apparatus of claim 19, wherein the one or more processor-readable instructions are further executable by the one or more processors to cause the apparatus to:
transmit the feedback message separately from the inter-UE coordination.

23. The apparatus of claim 19, wherein the one or more processor-readable instructions to perform the inter-UE coordination are executable by the one or more processors to cause the apparatus to:
transmit, based at least in part on a contention-free channel access procedure, the inter-UE coordination.

24. The apparatus of claim 19, wherein the one or more processor-readable instructions to perform the inter-UE coordination are executable by the one or more processors to cause the apparatus to:
   perform a channel access procedure on the sidelink channel; and
   perform the inter-UE coordination based at least in part on a result of the channel access procedure.

25. The apparatus of claim 19, wherein the one or more processor-readable instructions are further executable by the one or more processors to cause the apparatus to:
   communicate sidelink control signaling via the sidelink feedback channel.

26. An apparatus for wireless communication at a first user equipment (UE), comprising:
   one or more processors;
   one or more memories coupled with the one or more processors; and
   one or more processor-readable instructions stored in the one or more memories and executable by the one or more processors, individually or collectively, to cause the apparatus to:
      transmit sidelink communications to a second UE via a sidelink channel;
      receive a feedback message from the second UE via a sidelink feedback channel using a first resource configuration that indicates a first set of one or more sidelink feedback channel resources, the feedback message being based at least in part on the sidelink communications, and wherein the first set of one or more sidelink feedback channel resources is associated with a first set of subchannels of a frequency band and a quantity of cyclic shifting pairs for the sidelink feedback channel; and
      perform inter-UE coordination via the sidelink feedback channel using a second resource configuration of the sidelink feedback channel, wherein the second resource configuration indicates a second set of one or more sidelink feedback channel resources, the second set of one or more sidelink feedback channel resources different from the first set of one or more sidelink feedback channel resources and associated with a second set of subchannels of the frequency band, and wherein the feedback message is multiplexed with inter-UE coordination signaling using the first set of one or more sidelink feedback channel resources and the second set of one or more sidelink feedback channel resources.

27. The apparatus of claim 26, wherein the one or more processor-readable instructions are further executable by the one or more processors to cause the apparatus to:
   transmit an indication that the inter-UE coordination will be performed via the sidelink feedback channel using the second resource configuration.

28. The apparatus of claim 26, wherein the one or more processor-readable instructions are further executable by the one or more processors to cause the apparatus to:
   transmit a signal configuring the second resource configuration.

* * * * *